United States Patent
Aluvila

(10) Patent No.: US 11,785,111 B2
(45) Date of Patent: Oct. 10, 2023

(54) MANAGING INTER-SERVICE COMMUNICATION

(71) Applicant: Aptiv Technologies Limited, St. Michael (BB)

(72) Inventor: Vinod Aluvila, Hildesheim (DE)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 17/656,571

(22) Filed: Mar. 25, 2022

(65) Prior Publication Data

US 2022/0311835 A1 Sep. 29, 2022

(30) Foreign Application Priority Data

Mar. 26, 2021 (EP) ..................................... 21165340
Mar. 23, 2022 (EP) ..................................... 22163826

(51) Int. Cl.
*H04L 67/56* (2022.01)
*H04L 67/51* (2022.01)
(Continued)

(52) U.S. Cl.
CPC .......... *H04L 67/56* (2022.05); *G06F 9/44505* (2013.01); *G06F 9/54* (2013.01);
(Continued)

(58) Field of Classification Search
CPC ...... H04L 67/56; H04L 67/60; H04L 61/4557
See application file for complete search history.

(56) References Cited

U.S. PATENT DOCUMENTS

| 11,457,080 B1 * | 9/2022 | Meduri | .................... H04L 67/60 |
| 2003/0055890 A1 * | 3/2003 | Senda | ................ H04N 1/32561 |
| | | | 709/227 |

(Continued)

FOREIGN PATENT DOCUMENTS

| CN | 110647754 | 1/2020 |
| CN | 110688233 | 1/2020 |

(Continued)

OTHER PUBLICATIONS

"Extended European Search Report", EP Application No. 21165340.7, dated Aug. 31, 2021, 11 pages.
(Continued)

*Primary Examiner* — Barbara B Anyan
(74) *Attorney, Agent, or Firm* — Colby Nipper PLLC

(57) ABSTRACT

This document discloses techniques, apparatuses, and systems for inter-service communication management to manage inter-service communication between a server-side service and a client-side service. The inter-service management system may comprise memory and a controller configured to perform the inter-service communication management. In aspects, a configuration file may be used to obtain information specifying a first inter-service communication mechanism for communicating one or more messages between the client-side and server-side services. The inter-service communication management system may instantiate a stub associated with the inter-service communication mechanism information, which can be used to communicate a message from the server-side service to a proxy that interacts with the client-side service. The message may then be forwarded from the proxy to the client-side service to enable inter-service communication between the server-side service and the client-side service.

22 Claims, 13 Drawing Sheets

(51) Int. Cl.
  *H04L 67/133* (2022.01)
  *G06F 9/445* (2018.01)
  *G06F 9/54* (2006.01)
  *H04L 67/60* (2022.01)
  *H04L 61/4557* (2022.01)

(52) U.S. Cl.
  CPC .............. *G06F 9/544* (2013.01); *G06F 9/546* (2013.01); *G06F 9/547* (2013.01); *H04L 61/4557* (2022.05); *H04L 67/133* (2022.05); *H04L 67/51* (2022.05); *H04L 67/60* (2022.05)

(56) References Cited

U.S. PATENT DOCUMENTS

| | | | | |
|---|---|---|---|---|
| 2006/0233180 | A1* | 10/2006 | Serghi | H04L 67/56 370/401 |
| 2008/0222659 | A1 | 9/2008 | Brumme et al. | |
| 2014/0059566 | A1* | 2/2014 | Benedek | G06F 9/54 719/313 |
| 2015/0347749 | A1* | 12/2015 | Kiehtreiber | G06F 9/546 726/26 |
| 2017/0034117 | A1* | 2/2017 | Yasrebi | H04L 61/4557 |
| 2019/0182295 | A1 | 6/2019 | Benedek et al. | |
| 2020/0389469 | A1* | 12/2020 | Litichever | H04W 4/40 |

FOREIGN PATENT DOCUMENTS

| | | |
|---|---|---|
| EP | 0522773 | 9/1996 |
| EP | 0485252 | 2/1998 |
| KR | 101927721 | 2/2019 |

OTHER PUBLICATIONS

Grone, et al., "Conceptual Architecture Patterns: FMC-based Representations", Apr. 2004, 67 pages.

Stets, et al., "Component-Based APIs for Versioning and Distributed Applications", Jul. 1, 1999, pp. 54-61.

"Extended European Search Report", EP Application No. 22163826.5, dated May 31, 2022, 11 pages.

Chen, et al., "Offloading Android Applications to the Cloud Without Customizing Android", Mar. 19, 2012, pp. 788-793.

\* cited by examiner

MANAGING INTER-SERVICE COMMUNICATION

CROSS-REFERENCE TO RELATED APPLICATION

This application claims priority to European Patent Application Number 22163826.5, filed Mar. 23, 2022, and European Patent Application Number 21165340.7, filed Mar. 26, 2021, the disclosures of which are hereby incorporated by reference in their entireties herein.

BACKGROUND

Distributed Software Architecture (or Service Oriented Architecture) has become ever more important of late. Software components may be designed as services which are developed by distributed teams and suppliers. Such services may be integrated into original equipment manufacturer (OEM) systems. The distributed services may be designed to interact with each other via Inter-Process Communication (IPC) mechanisms. Such IPC mechanisms are available in various formats. However, an IPC format suited for a particular platform or a given scenario might not perform well in another scenario.

The implementation of the business logic of such services is often tightly coupled with the implementation of IPC mechanisms used to interact with other services in the system. This fact greatly hinders the portability of the services which makes it difficult to port them to another platform configured to support other IPC mechanisms. Considerable effort is necessary to re-implement the service with the alternate IPC mechanisms, to make it possible to deploy the service on another platform.

FIG. 1 shows the architecture of a system 100 in accordance with the prior art. Multiple services 105 are provided. Each service is configured to interact with an IPC stack layer 110 which is, in turn, provided on a suitable platform 115. The platform 115 may be implemented as a system on a chip (SoC) or as a distributed platform.

In order for messages to be sent from one service 105 to another service 105 using the IPC mechanism it is necessary to provide each service with an IPC application programming interface (API) layer 120. A first service $105_1$ may need to exchange messages with a second service $105_2$ in accordance with business logic $106_1$ of the first service $105_1$ and/or the business logic of the second service $105_2$. The IPC API layer 120 provides the services 105 with the code necessary to allow message transport between the first service $105_1$ and the second service $105_2$ via the IPC stack layer 110. The IPC stack layer 110 shown in FIG. 1 provides an IPC mechanism in accordance with a particular IPC format. Messages are serialized by a serialization/deserialization layer $125_1$ prior to being sent from the first service $105_1$ via the IPC stack layer 110. The messages are deserialized by a serialization/deserialization unit $125_2$ after being received at the second service $105_2$. The deserialized message is then in a format that can be read by the second service $105_2$. The serialization and deserialization are performed using a format that is specific to the IPC format used for the transport of messages.

This prior art approach has encountered several drawbacks. The business logic of each service is tightly coupled with the specific IPC mechanism used for the exchange of messages between services. Since the business logic is closely tied to the IPC mechanisms, interface definitions are IPC-specific and need to be re-implemented in different interface description language (IDL) formats for different IPCs. Therefore, it is very difficult to switch a particular service from using one IPC mechanism to another IPC mechanism. Indeed, switching from one IPC mechanism to different IPC mechanism may require the business logic of the service to be adapted. Furthermore, as explained above, serialization and deserialization of the data structures to be exchanged between the services is specific to a particular IPC mechanism. Consequently, a particular service cannot support multiple IPC mechanisms simultaneously.

SUMMARY

The present disclosure relates to managing inter-service communication between services, particularly in a distributed environment. A first aspect of the present disclosure provides a method of managing inter-service communication between a server-side service and a client-side service, the method comprising obtaining, by an inter-service communication management system and from a configuration file associated with the server-side service, information specifying a first inter-service communication mechanism to be used to send one or more messages from the server-side service to the client-side service; instantiating, at the inter-service communication management system, a stub associated with the first inter-service communication mechanism specified by the configuration file, wherein the stub is operable to interact with the server-side service; receiving, at the stub, a message from the server-side service to be forwarded to a proxy of the client-side service using the first inter-service communication mechanism associated with the stub, wherein the proxy is associated with the first inter-service communication mechanism; and forwarding the message from the stub to the proxy of the client-side service in accordance with the first inter-service communication mechanism specified by the configuration file associated with the server-side service.

The configuration file may specify an inter-process communication (IPC) mechanism and the stub may be associated with the specified IPC mechanism, the method may further comprise obtaining application programming interface, API, information relating to the IPC mechanism associated with the stub; and instantiating a first endpoint of an IPC channel of the IPC mechanism associated with the stub in accordance with the API information of the IPC mechanism associated with the stub.

Forwarding the message from the stub to the proxy may comprise forwarding the message from the stub to the first endpoint of the IPC channel of the IPC mechanism associated with the stub; and sending the message from the first end point of the IPC channel associated with the stub to a second endpoint of the IPC channel associated with the proxy.

The configuration file may specify a non-IPC mechanism and forwarding the message from the stub to the proxy may comprise directly forwarding the message from the stub to the proxy using one or more direct function calls.

The method may further comprise detecting a change to the configuration file of the server-side service updating the inter-service communication mechanism from the first inter-service communication mechanism to a second inter-service communication mechanism and, in response thereto, terminating the stub associated with the first inter-service communication mechanism and instantiating a stub associated with the second inter-service communication mechanism.

A second aspect of the present disclosure provides a method of managing inter-service communication between a client-side service and a server-side service, the method comprising obtaining, by an inter-service communication management system and from a configuration file associated with the client-side service, information specifying a first inter-service communication mechanism for receiving one or more messages at the client-side service from the server-side service; instantiating, at the inter-service communication management system, a proxy associated with the first inter-service communication mechanism specified by the configuration file, wherein the proxy is operable to interact with the client-side service; receiving, at the proxy, a message from a stub associated with the first inter-service communication mechanism specified by the configuration file; and forwarding the message from the proxy to the client-side service.

The configuration file may specify an inter-process communication (IPC) mechanism and the proxy may be associated with the specified IPC mechanism, the method may further comprise obtaining application programming interface, API, information relating to the IPC mechanism associated with the proxy; and instantiating a second endpoint of an IPC channel of the IPC mechanism associated with the proxy in accordance with the API information of the IPC mechanism associated with the proxy.

Receiving, at the proxy, a message from the server-side service may comprise activating, by the inter-service communication management system, the proxy using a listener associated with the client-side service.

The configuration file may specify a non-IPC mechanism and receiving the message at the proxy may comprise receiving, at the proxy, one or more direct function calls from the stub associated with the server-side service.

The method may further comprise detecting a change to the configuration file updating the inter-service communication mechanism from the first inter-service communication mechanism to a second inter-service communication mechanism and, in response thereto, terminating a proxy associated with the first inter-service communication mechanism and instantiating a proxy associated with the second inter-service communication mechanism.

A third aspect of the present disclosure provides a computer readable medium comprising computer-readable instructions that, when executed by one or more processors, cause the one or more processors to perform the method of the first or second aspect.

A fourth aspect of the present disclosure provides an inter-service communication management system for managing inter-service communication between a server-side service and a client-side service, the inter-service communication management system comprising memory and a controller configured to obtain, from a configuration file associated with the server-side service, information specifying a first inter-service communication mechanism for sending one or more messages from the server-side service to the client-side service; instantiate, at the inter-service communication management system, a stub associated with the inter-service communication mechanism specified by the configuration file, wherein the stub is operable to interact with the server-side service; obtain, from a configuration file associated with the client-side service, information specifying the first inter-service communication mechanism for receiving one or more messages at the client-side service from the server-side service; instantiate, at the inter-service communication management system, a proxy associated with the first inter-service communication mechanism specified by the configuration file, wherein the proxy is operable to interact with the client-side service; receive, at the stub, a message from the server-side service to be sent to the client-side service using the first inter-service communication mechanism associated with the stub; forward the message from the stub to the proxy in accordance with the first inter-service communication mechanism; receive, at the proxy, the message from the stub in accordance with the first inter-service communication mechanism; and forward the message from the proxy to the client-side service.

The first inter-service communication mechanism may be an inter-process communication (IPC) mechanism and the stub and the proxy may each be associated with the IPC mechanism, the controller may be further configured to obtain application programming interface, API, information relating to the IPC mechanism; and instantiate a first endpoint of an IPC channel of the IPC mechanism associated with the stub in accordance with the API information of the IPC mechanism associated with the stub; and instantiate a second endpoint of the IPC channel of the IPC mechanism associated with the proxy in accordance with the API information of the IPC mechanism associated with the proxy.

The first inter-service communication mechanism may be a non-IPC mechanism, and wherein forwarding the message from the stub to the proxy comprises directly forwarding the message from the stub to the proxy using one or more direct function calls.

The controller may be further configured to detect a change to the configuration file of the server-side service updating the inter-service communication mechanism of the server-side service from a first inter-service communication mechanism to a second interservice communication mechanism and, in response thereto, terminate the stub associated with the first inter-service communication mechanism and instantiate a stub associated with the second inter-service communication mechanism; and/or detect a change to the configuration file of the client-side service updating the inter-service communication mechanism of the client-side service from a first inter-service communication mechanism to a second inter-service communication mechanism and, in response thereto, terminate the proxy associated with the first inter-service communication mechanism and instantiate a proxy associated with the second inter-service communication mechanism.

BRIEF DESCRIPTION OF THE DRAWINGS

So that the disclosure described herein may be fully understood, various examples will be described with reference to the accompanying drawings, in which.

DETAILED DESCRIPTION

Figure 1:
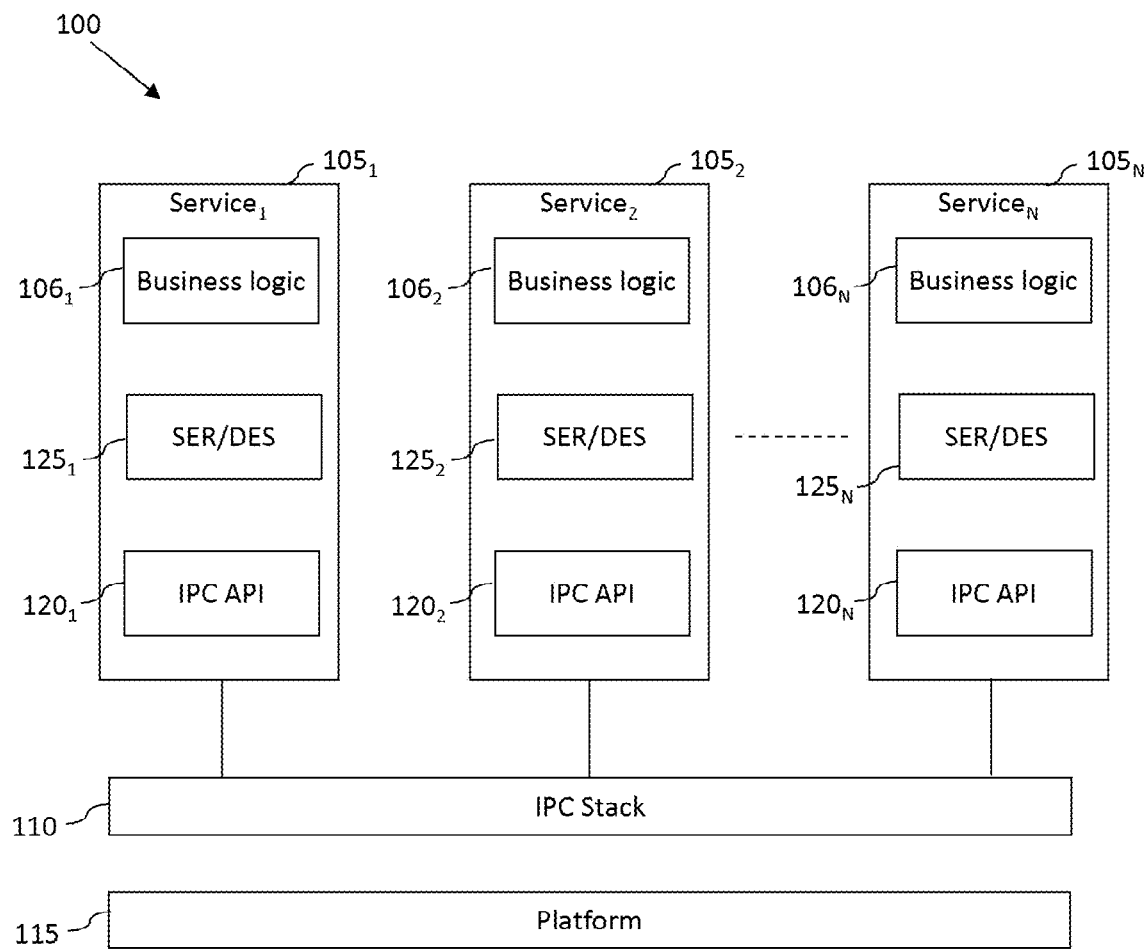
FIG. 1 is a schematic block diagram illustrating a system in accordance with the prior art.

Embodiments of the present disclosure allow services in a distributed environment to communicate with each other in a way that overcomes the problems outlined above.

Embodiments described herein allow communication between services to be effectively managed. In particular, inter-service communication mechanisms can be selected for individual services (both at the server-side and at the client-side) by specifying a particular inter-service communication mechanism in a configuration file associated with that service. Communication pathways between servers and clients using the same inter-service communication mechanisms are established using an inter-service communication management system. The inter-service communication management system is responsible for instantiating a stub associated with the inter-service communication mechanism specified in the configuration file of the server. The inter-service communication management system is responsible for instantiating a proxy associated with the inter-service communication mechanism specified in the configuration file of the client. The inter-service communication management system may support multiple stubs associated with respective servers and multiple proxies associated with multiple clients. Servers and clients specifying the same inter-service communication mechanism in their respective configuration files may exchange messages via a communication pathway between the stub and the proxy.

In some embodiments, the inter-service communication mechanism is an inter-process communication (IPC) mechanism. In addition to establishing stubs and proxies associated with the server-side service and client-side service respectively, the inter-service communication management module further instantiates IPC channel endpoints to allow inter-service communication via the IPC mechanism specified in the configuration file. Therefore, a server and a client specifying the same IPC mechanism can interact, for example by exchanging messages, via a communication pathway defined by the specified IPC mechanism.

In some embodiments, a non-IPC communication mechanism is used to establish a communication pathway between a server and a client. In such embodiments, the inter-service communication management module maintains a database containing information identifying servers that specify a non-IPC communication mechanism. The database further identifies clients that specify an identifier of a server in a configuration file of the client. The inter-service communication management module establishes a logical connection between the server and the client. Communication between the server and the client may therefore be established using one or more direct function calls. The configuration file of each server and each client may be editable so that a user can change the inter-service communication mechanism of a particular server or client from a first inter-service communication mechanism to a second inter-service communication mechanism. Updating the inter-service communication mechanism may be from a first IPC mechanism to a second IPC mechanism. Updating the inter-service communication mechanism may be from an IPC mechanism to a non-IPC mechanism. Updating the inter-service communication mechanism may be from a non-IPC mechanism to an IPC mechanism.

Furthermore, the configuration file of each server and client may specify more than one inter-service communication mechanism. For a server specifying more than one inter-service communication mechanism a stub may be instantiated for each inter-service communication mechanism. Likewise, for a client specifying more than one inter-service communication mechanism, a proxy may be instantiated for each inter-service communication mechanism. This allows the client and/or the server to communicate via different communication pathways simultaneously.

The development of server-side services and client-side services is simplified in accordance with embodiments described herein. The application programming interface (API) of any particular communication mechanism is abstracted to the inter-service communication management module. Therefore, developers of server-side and client-side services do not need to include the API of a specific communication mechanism. Instead, a generic API may be provided that allows interaction with the inter-service communication management module. This enables the inter-service communication mechanism of a particular server or client to be updated without requiring any re-programming of the logic of that server or client.

In embodiments employing inter-process communication (IPC), the API necessary to allow transport of messages via an IPC mechanism is abstracted away from the services themselves to an IPC management layer. Each service has an associated configuration file in which an IPC mechanism or format is specified for that service.

A service at the server-side, i.e. the service responsible for providing a service to a client is operable to instantiate a stub at the IPC management layer associated with a particular IPC mechanism specified in the configuration file as an output IPC mechanism for that service. The IPC management layer is configured to access an application programming interface, API, library for the IPC mechanism specified in the configuration file of the service sending the message. The API library contains API information including the protocols and definitions specific to that IPC mechanism. API information obtained from the API library for the specified IPC mechanism may then be used to instantiate an IPC channel endpoint at a network interface associated with the server-side service.

A corresponding arrangement is provided at the client-side to allow consumption of a service provided by the server. The client-side service is operable to instantiate a proxy at the IPC management layer associated with a particular IPC mechanism specified in the configuration file as an input IPC mechanism for that service. The IPC management layer is configured to access an application programming interface, API, library for the IPC mechanism specified in the configuration file of the client-side service. The API library contains API information including the protocols and definitions specific to that IPC mechanism. API information obtained from the API library for the specified IPC mechanism may then be used to instantiate an IPC channel endpoint at a network interface associated with the client-side service.

After the stub and server-side IPC channel endpoint have been instantiated at the server-side and after the proxy and client-side IPC channel endpoint have been instantiated at the client-side service, messages may be sent from the server to the client. The messages are sent in accordance with the IPC mechanism specified in the configuration files of the respective services. Furthermore, messages may be sent from the client to the server. For example, a client may send a request message to a server. Such a request message may forwarded from the proxy to the stub. The messages forwarded from the server to the client may take the form of a response message to the request message sent from the client to the server.

Advantageously, the business logic of the services themselves are not dependent on any particular IPC mechanism and the API information associated with any particular IPC mechanism. As such, it is only necessary to provide each service with generic API information to interact with the IPC management layer. It is not necessary to provide API information specific to a particular IPC format at the service layer.

Furthermore, the IPC management layer may be operable to serialize/deserialize messages using a serialization/deserialization format that is independent of the various IPC formats supported by the platform. Alternatively, the message to be sent may be serialized by the service itself.

Figure 2:
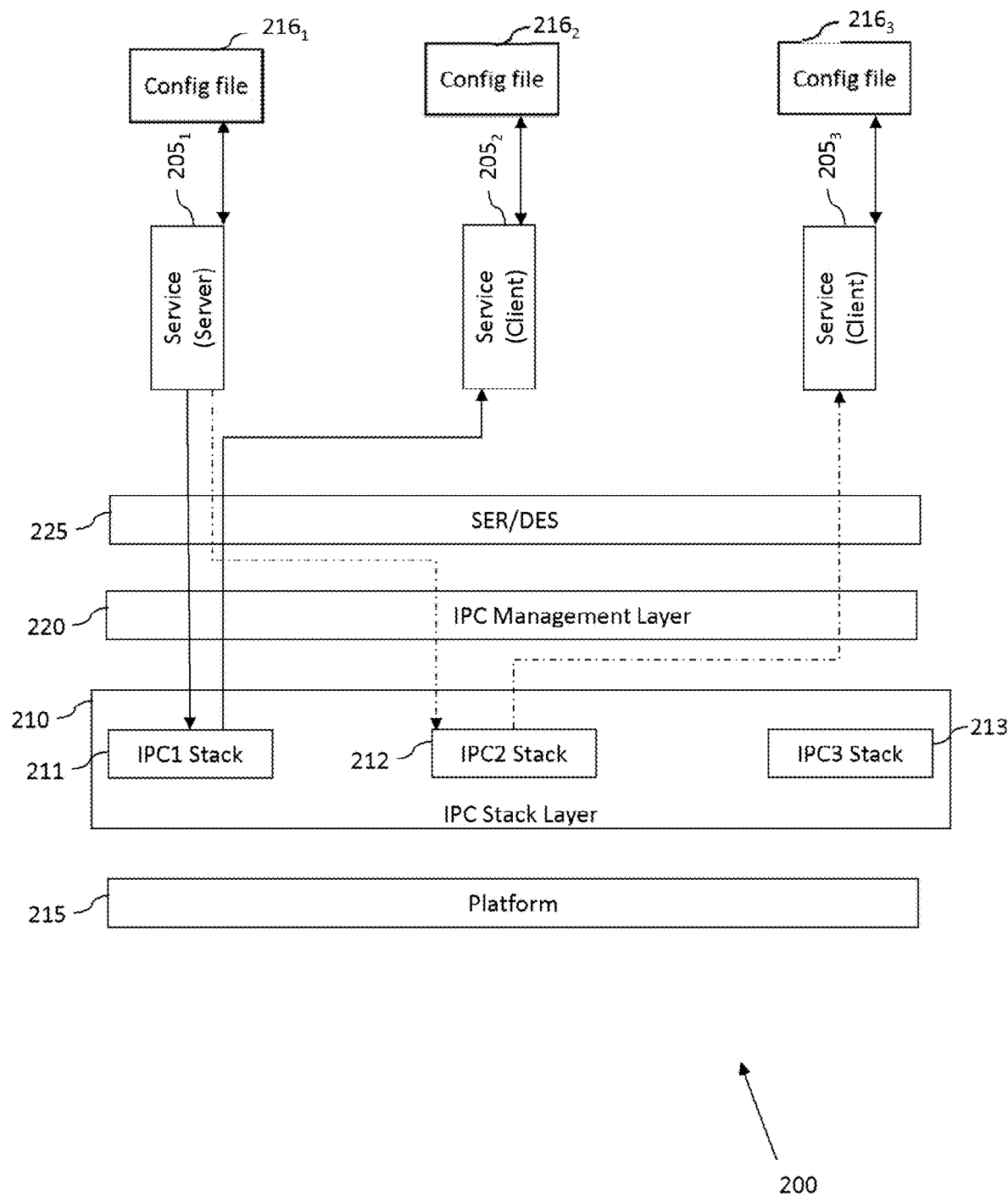
FIG. 2 is a schematic block diagram illustrating a schematic block diagram in accordance with embodiments of the present disclosure.

FIG. 2 is a schematic block diagram illustrating an example system 200. The system 200 includes services 205. The services 205 include a service $205_1$ which, in this example, sends one or more messages to one or more services $205_2$, $205_3$. Since the service $205_1$ is sending messages to the services $205_2$, $205_3$, the service $205_1$ may also be referred to as a server. The services $205_2$, $205_3$ may be referred to herein as clients since the services $205_2$, $205_3$ receive messages sent by the service $205_1$. However, it should be noted that each of the services 205 may be configured to both send and receive messages. As such, each of the services 205 may be configured to function as both a server and as a client. Depending on the business logic of the respective services, it is possible for a first service $205_1$ to act as a server providing a service to a second service $205_2$ which acts as a client whilst at the same time the first service $205_1$ can act as a client receiving a service from the second service $205_2$ which, in turn, acts as a server.

The system 200 includes an IPC stack layer 210. The IPC stack layer 210 is provided on a platform 215. The platform 215 may be a system on a chip (SoC). Alternatively, the platform 215 may be a cloud platform. The IPC stack 210 is configured to act as the layer responsible for transporting a message from the server to the client in accordance with a particular IPC mechanism. The IPC stack 210 may include the hardware and software required to allow the transport of messages via an IPC mechanism. The IPC stack 210 may be implemented as one or more IPC channel endpoints used to send and receive one or more messages via an IPC channel.

Each of the services 205 has an associated configuration file defining one or more input IPC mechanisms and one or more output IPC mechanisms. The configuration file is editable by a user so that the input and output IPC mechanisms used by a service can be changed.

The system 200 includes an IPC management layer 220. The IPC management layer 220 obtains implementation information from a library associated with the specified IPC mechanism that is required to implement the specified IPC mechanism. The implementation information may include the API information that defines the rules that are followed for a particular IPC mechanism. The API information for a particular IPC mechanism is used to instantiate IPC channel endpoints to allow messages to be sent and received via an IPC channel for that particular IPC mechanism.

Messages to be sent via an IPC mechanism may be serialized prior to transport. Likewise, messages received at a client end service may be deserialized. In the embodiment illustrated in FIG. 2, the IPC management layer 220 serializes messages prior to transport and deserializes received messages. The IPC management layer 220 may access a message serialization/deserialization layer 225 to perform message serialization/deserialization. In embodiments of the present disclosure, message serialization/deserialization is performed using a format that is independent of the IPC mechanism used for the transport of the messages. Embodiments described herein perform serialization/deserialization using Google Protocol Buffers however other serialization/deserialization formats that are known in the art may be used as alternatives.

Alternatively, message serialization may be performed by the server-side service prior to providing the message to the IPC management layer 220. Likewise, the client-side service may de-serialize a message after the client has received the message from the IPC management layer 220. In embodiments where message serialization/deserialization is performed by the services themselves, the format used may also be independent of the IPC mechanism used to transport the messages. For example, Google Protocol Buffers may be used to serialize/deserialize messages by the services.

The IPC stack 210 includes IPC stacks 211, 212, 213 configured to support IPC mechanisms IPC1, IPC2, IPC3 respectively. The IPC stacks 211, 212, 213 include the network interfaces and IPC channel endpoints to enable message transport through the transport layer. Example IPC mechanisms may include WebSockets, ZeroMQ, MQTT, DBus, SOME/IP or any other IPC mechanism known in the art. As such, an IPC mechanism may be considered as any protocol configured to allow message transport between two services via the transport layer. The IPC mechanism may allow communication via a shared memory on the same device or transport of messages between devices via a network.

In the example shown in FIG. 2, a server-side service $205_1$ is configured to send messages to client-side services $205_2$, $205_3$. As such, the service $205_1$ acts as the server and the services $205_2$, $205_3$ each acts as a client in communication with the service $205_1$. In this example, the service $205_1$ is configured to transport messages to the service $205_2$ via IPC1 stack 211, that is an IPC stack using the IPC mechanism IPC1. The service $205_1$ is configured to transport messages to the service $205_3$ via IPC2 stack 212, that is an IPC stack using the IPC mechanism IPC2.

Therefore, in this example the service $205_1$ is configured to send messages via two IPC mechanisms simultaneously. It will be appreciated that each of the services 205 may be configured to receive messages via more than one IPC mechanism.

In this example, the configuration file $216_1$ for the service $205_1$ specifies output IPC mechanisms IPC1 and IPC2. Separate stubs, corresponding to IPC mechanisms IPC1 and IPC2 may be instantiated at the IPC management layer 220. IPC channel endpoints for IPC mechanisms IPC1 and IPC2 may be instantiated at a network interface using API information from respective API libraries. In its associated configuration file $216_1$, the service $205_2$ specifies input IPC mechanism IPC1. A proxy corresponding to IPC mechanism IPC1 is instantiated at the IPC management layer 220. An IPC channel endpoint for IPC mechanism IPC1 may be instantiated at a network interface using API information from the API library for IPC mechanism IPC1.

In its associated configuration file $216_3$, the service $205_3$ specifies input IPC mechanism IPC2. A proxy, corresponding to IPC mechanism IPC2, is instantiated at the IPC management layer 220. An IPC channel endpoint for IPC mechanism IPC2 may be instantiated at a network interface using API information from the API library for IPC mechanism IPC2.

The configuration file associated with each service may be configured to specify one or more output IPC formats and one or more input IPC formats. The one or more output IPC formats specify the IPC mechanisms to be used for the output of messages via respective channels by the service acting as a server. The one or more input IPC formats specify the IPC mechanisms through which the service (acting as a client) is configured to receive messages. The input and output IPC formats may be updated via a user input. Upon detecting a user input, existing stubs, proxies, and channel endpoints may be terminated. Replacement stubs, proxies and IPC channel endpoints may be instantiated in response to detecting an update of an IPC format.

This approach has the advantage that the IPC management layer 220 performs the functionality of managing the sensing and receiving of messages via particular IPC mechanisms. In the prior art, this functionality would have to be performed by the services themselves using a specific API for the IPC mechanism to be used. The IPC management layer 220 may be understood to form an abstraction layer of the API of the various IPC mechanisms.

As stated above, the platform 215 may be a cloud platform. Accordingly, each of the elements shown in FIG. 2 may reside in a separate host device with access to a network in a distributed environment. Some or all of the elements shown in FIG. 2 may reside on the same host device. In some embodiments, all of the elements shown in FIG. 2 may reside on the same host device. In such embodiments, the platform 215 may be implemented as a system on a chip (SoC).

Figure 3A:
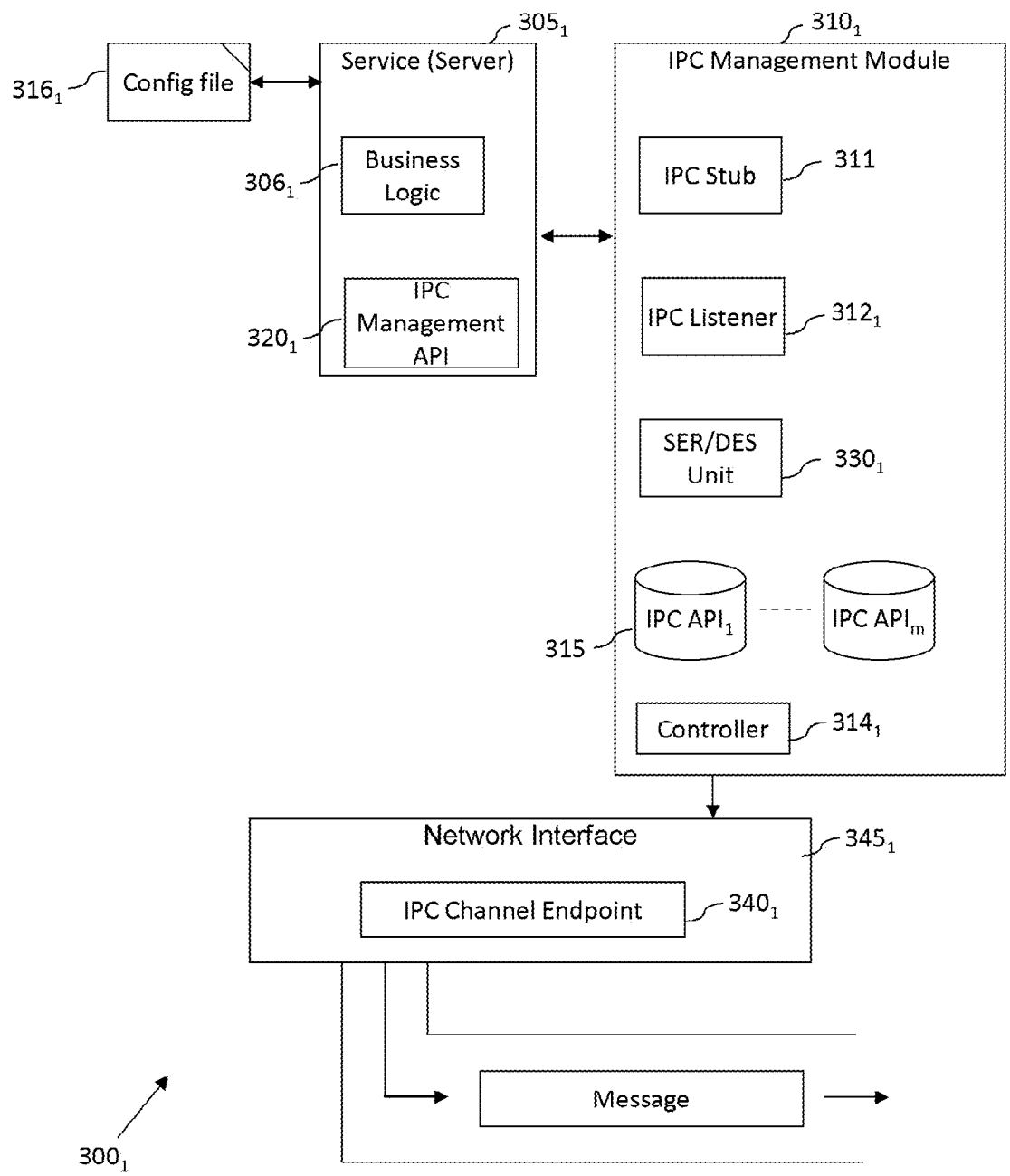
FIG. 3A is a schematic block diagram of a server-side system in accordance with embodiments of the present disclosure.
Figure 3B:
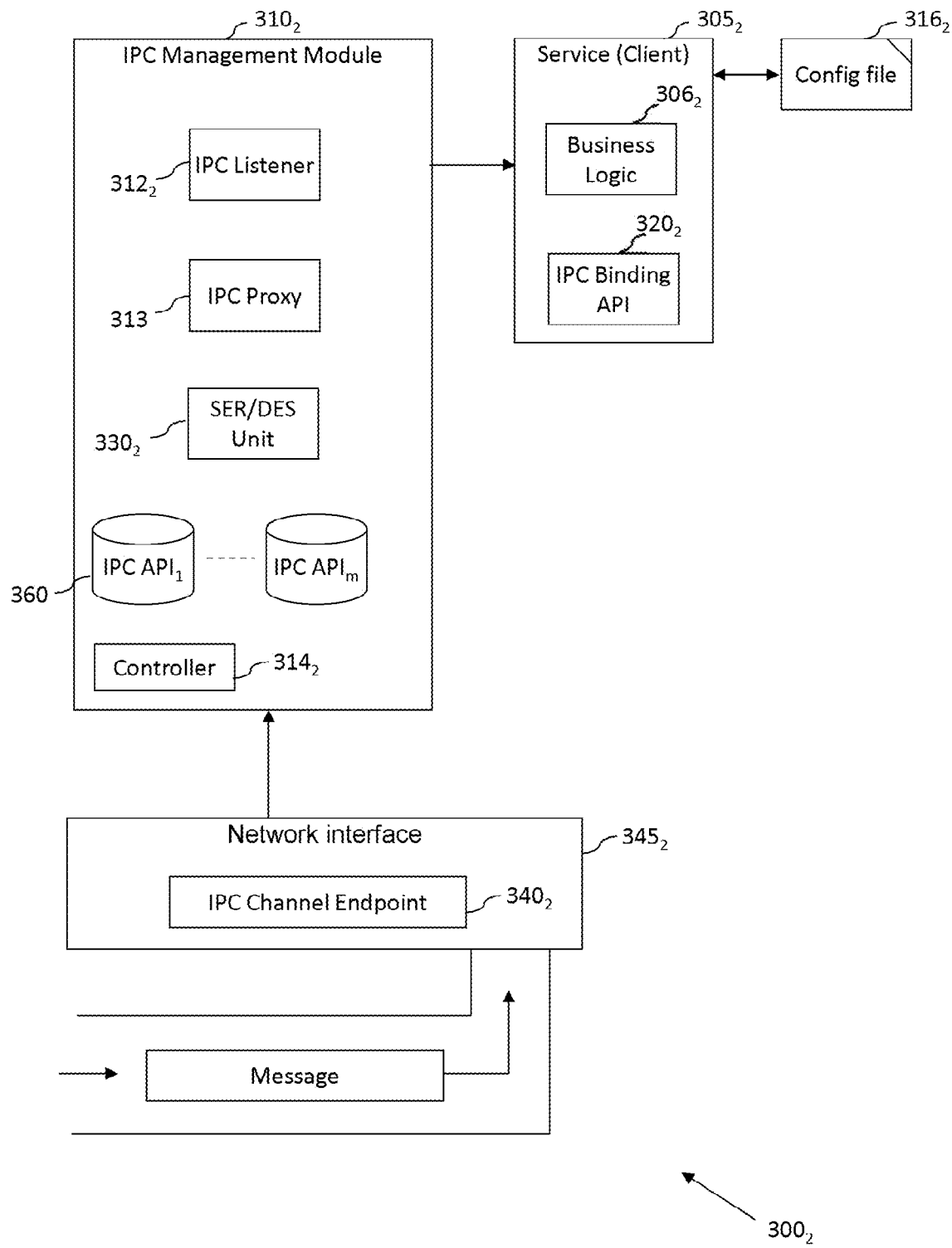
FIG. 3B is a schematic block diagram of a client-side system in accordance with embodiments of the present disclosure.

FIGS. 3A and 3B are schematic block diagrams illustrating functional units of a server-side system and a client-side system respectively, in accordance with embodiments of the present disclosure. The server-side system and client-side system may form a distributed computing system. Alternatively, the server-side system and client-side system may be provided on a single computing device.

Figure 4:
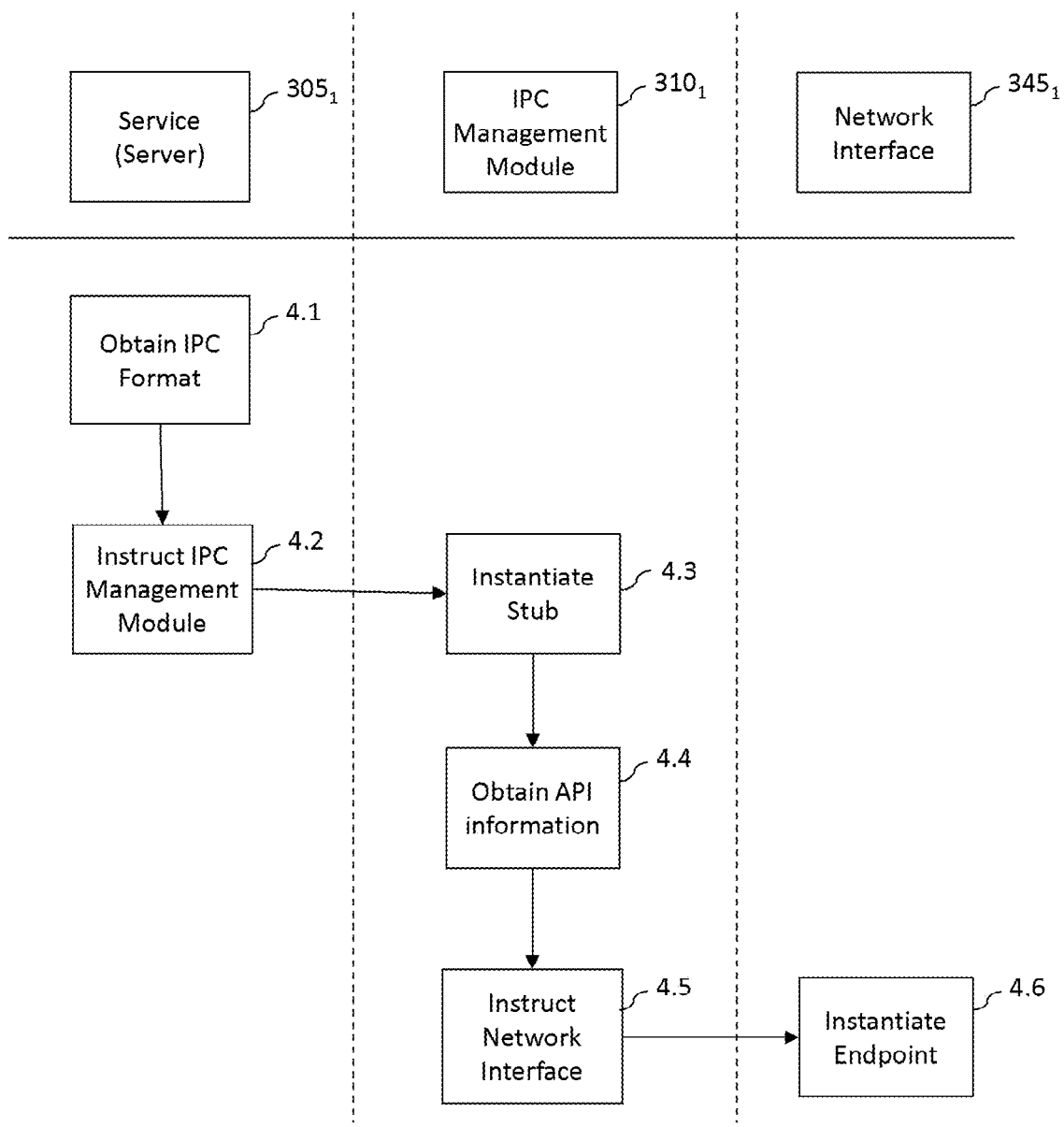
FIG. 4 is a flow chart illustrating operations performed to instantiate a stub and an endpoint in accordance with embodiments of the present disclosure.
Figure 6A:
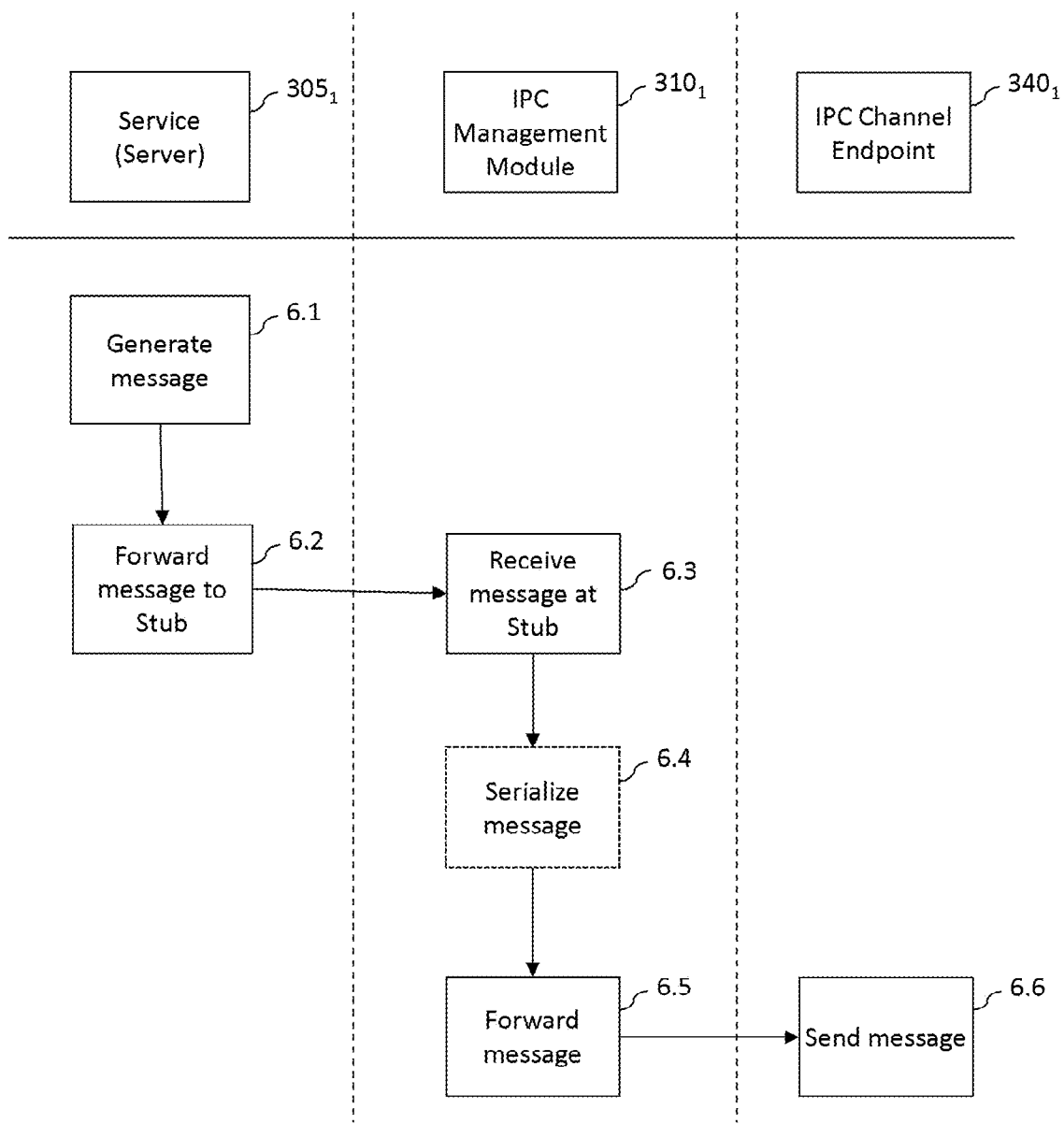
FIG. 6A is a flow chart illustrating operations performed to send a message in accordance with embodiments of the present disclosure.

FIG. 3A illustrates components of the server-side system $300_1$. FIG. 4 is a flow chart illustrating steps taken at the server-side system $300_1$ to establish a communication pathway from the first service $305_1$ to the network interface $345_1$ to allow communication using a particular IPC mechanism. FIG. 6A is a flow chart illustrating steps taken at the server-side system $300_1$ to send a message from the server-side system $300_1$ to the client-side system $300_2$.

Figure 5:
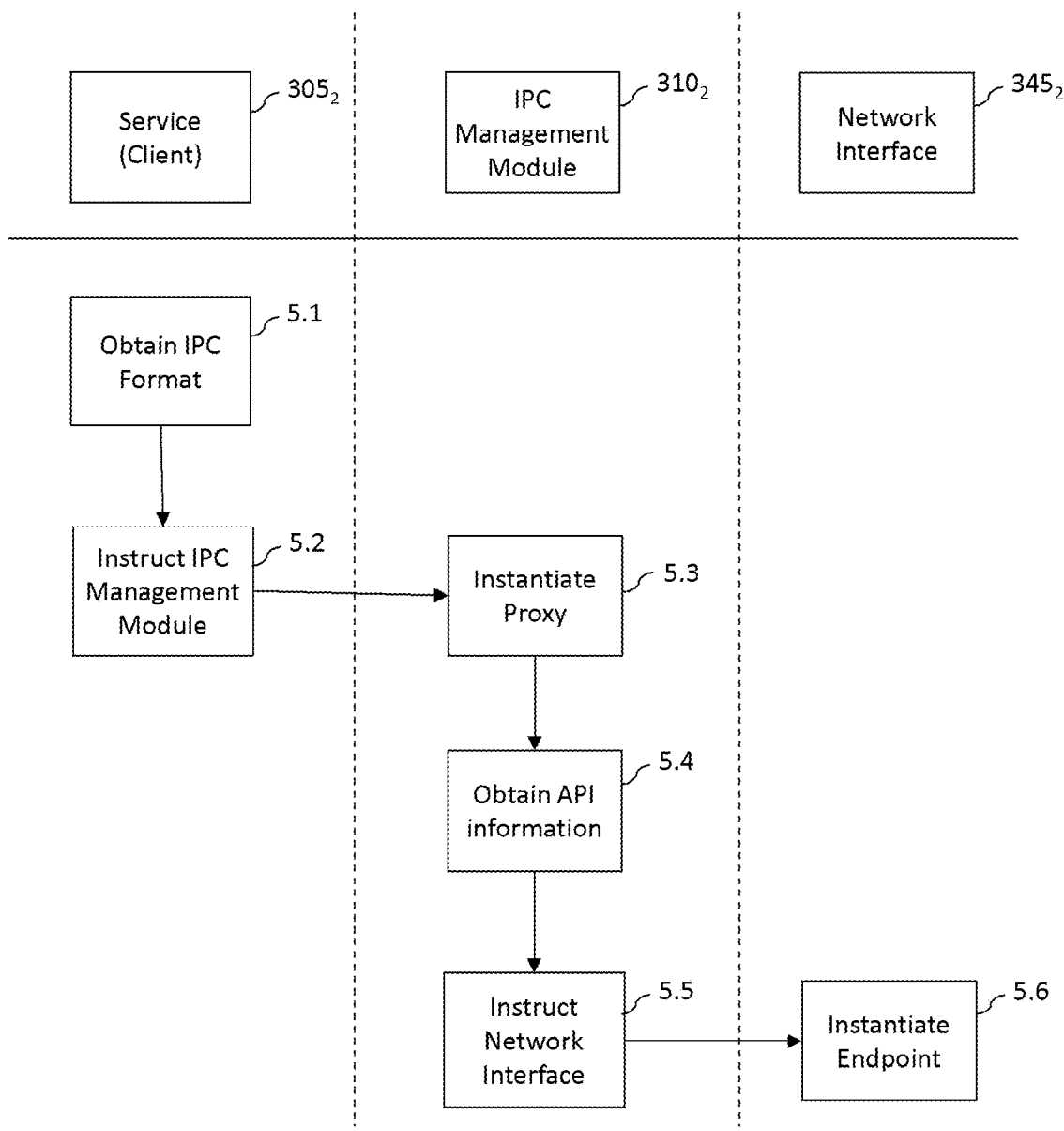
FIG. 5 is a flow chart illustrating operations performed to instantiate a proxy and an endpoint in accordance with embodiments of the present disclosure.
Figure 6B:
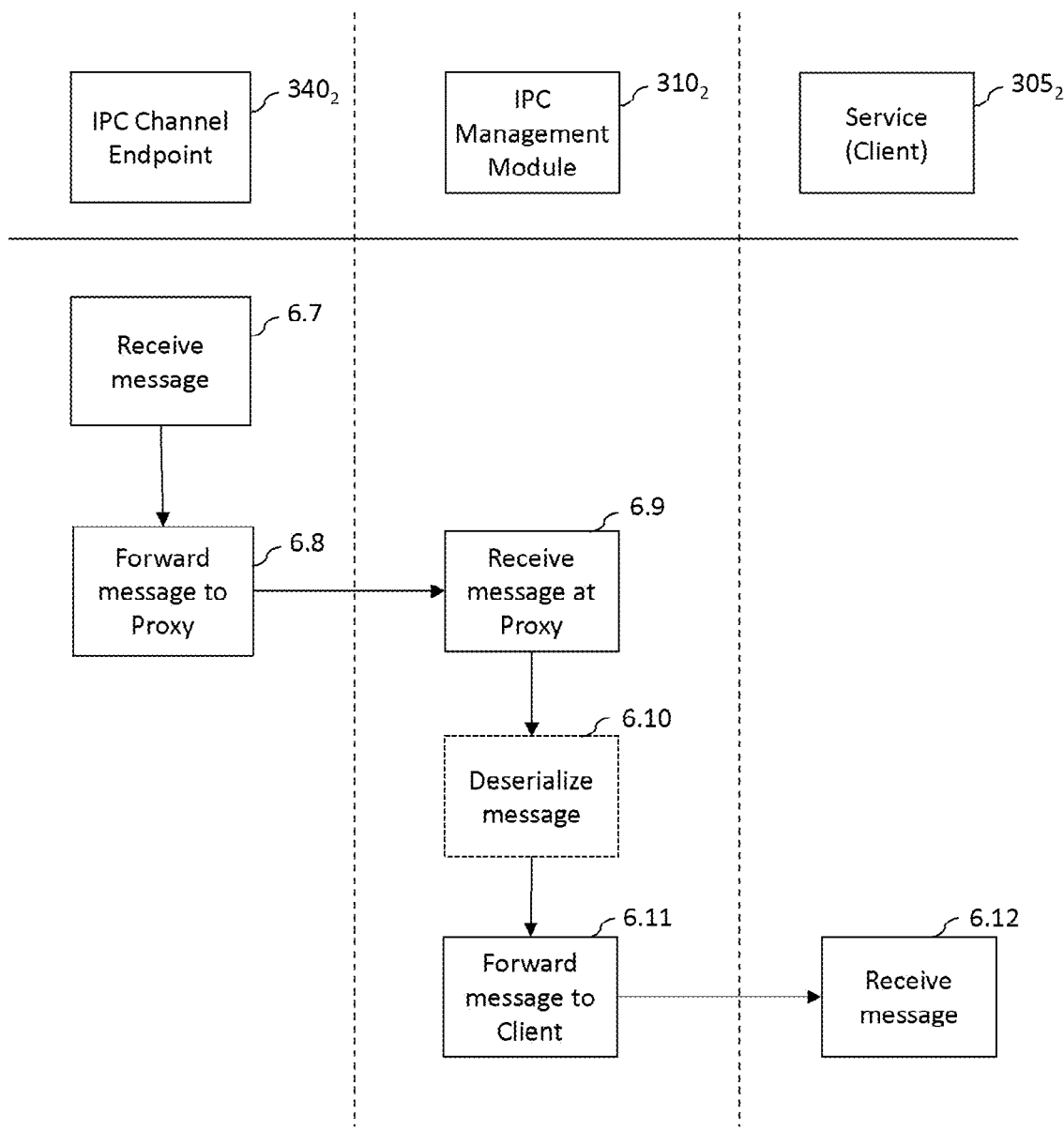
FIG. 6B is a flow chart illustrating operations performed to receive a message in accordance with embodiments of the present disclosure.

FIG. 3B illustrates components of the client-side system $300_2$. FIG. 5 is a flow chart illustrating steps taken at the client-side system $300_2$ to establish a communication pathway from the second service $305_2$ to the network interface $345_2$ in accordance with an input IPC mechanism of the second service $305_2$. FIG. 6B is a flow chart illustrating steps taken at the client-side system $300_2$ to receive a message at the client-side system $300_2$ from the server-side system $300_1$.

Referring to FIG. 3A, the server-side system $300_1$ includes a first service $305_1$ acting as a server (i.e. the entity providing a service to a client). The first service $305_1$ includes business logic $306_1$ to provide the functionality of the first service $305_1$. The first service $305_1$ may further include IPC Management API $320_1$. The IPC Management API $320_1$ may contain information defining the interactions between the first service $305_1$ and the IPC management layer. The IPC Management API $320_1$ is independent of the IPC mechanism to be used when sending the message from the first service $305_1$ to the second service $305_2$. This is in contrast to prior approaches where an API is provided to a particular service that is specific to the IPC mechanism to be used by that service.

The first service $305_1$ has a configuration file $316_1$ associated therewith. The configuration file $316_1$ may be stored locally with respect to the first service or may be stored remotely. The configuration file $316_1$ contains information specifying one or more output IPC mechanisms. Additionally, the configuration file $316_1$ may contain information specifying one or more input IPC mechanisms. As such, the first service $305_1$ may be configured to act as both a server and as a client in embodiments of the disclosure since the first service can both output messages to be sent via an output IPC mechanism and can receive messages sent via an input IPC mechanism.

The server-side system $300_1$ includes an IPC management module $310_1$ in communication with the first service $305_1$. The IPC management module $310_1$ includes an IPC Stub 311, and an IPC Listener $312_1$. The IPC management module is an example of an inter-service communication management module.

For example, the business logic $306_1$ of the first service $305_1$ may determine that one or more messages are to be sent. Referring to FIG. 4, the first service $305_1$ is configured to obtain information specifying an output IPC mechanism from the configuration file $316_1$ at step 4.1. The first service $305_1$ instructs the IPC Management Module $310_1$ to instantiate the IPC Stub 311 and optionally the IPC Listener $312_1$ at step 4.2. The first service $305_1$ may instruct the IPC Management Module $310_1$ to instantiate the IPC Stub 311 by generating a command specifying the output IPC mechanism with which the IPC Stub 311 is to be associated.

At step 4.3, the IPC Stub 311 is instantiated at the IPC Management Module $310_1$ by a controller $314_1$ of the IPC Management Module $310_1$. An IPC Listener $312_1$ may also be instantiated at this stage. The IPC Stub 311 and the IPC Listener $312_1$ are therefore each associated with the output IPC mechanism specified in the configuration file $316_1$ of the first service $305_1$. The IPC Listener $312_1$ may be configured to monitor the connection status of the second service $305_2$ and to inform the first service $305_1$ that the second service $305_2$ has connected or disconnected. The IPC Listener $312_1$ may also be configured to detect request messages received from the second service $305_2$.

The controller $314_1$ may then obtain API information stored in an IPC API library 315 associated with the IPC mechanism of the instantiated IPC Stub 311 and IPC Listener $312_1$ at step 4.4. An IPC API database for each IPC mechanism may be provided. The IPC API databases 315 may be stored locally at the IPC Management Module 310₁.

The controller 314₁ uses the information stored in the IPC API library 315 of the IPC mechanism of the IPC Stub 311 to instantiate an IPC Channel Endpoint 340₁ as part of a network interface 345₁. The controller 314₁ may instruct the Network Interface 345₁ at step 4.5 to instantiate the IPC Channel Endpoint 340₁. The IPC Channel Endpoint 340₁ is then instantiated at step 4.6.

In embodiments of the present disclosure, IPC Channel Endpoint 340₁ is configured as an interface with the underlying transport layer. In some embodiments, the IPC Channel Endpoint 340₁ interacts with the transport layer using the Transmission Control Protocol (TCP) protocol. In other embodiments, the IPC Channel Endpoint 340₁ interacts with the transport layer using the User Datagram Protocol (UDP).

The IPC Channel Endpoint 340₁ may be created by exchanging data with infrastructure of the transport layer specifying a combination of one or more of: protocol type, IP address, and port number of the server-side service, i.e. the first service 305₁ in this example. The structure and properties of the IPC Channel Endpoint 340₁ may be defined by the application programming interface (API) for the IPC mechanism. After the IPC Channel Endpoint 340₁ has been established, the IPC Channel Endpoint 340₁ serves as an endpoint for sending and receiving data through the transport layer.

The IPC Channel Endpoint 340₁ may be an endpoint for one of WebSockets, ZeroMQ, MQTT, DBus, SOME/IP or any other IPC mechanism.

As explained above, an IPC mechanism may be considered as any protocol configured to allow message transport between two services via the transport layer. The IPC mechanism may allow communication via a shared memory on the same device or transport of messages between devices via a network.

The IPC Stub 311 is configured to provide an interface between the first service 305₁ (acting as the server) and an IPC channel corresponding to a particular IPC mechanism specified in the configuration file 316₁ of the first service 305₁.

When a message is to be sent from the server-side system 300₁ to the client-side system 300₂, the first service 305₁ identifies the output IPC mechanism to be used for sending the message from the configuration file 316₁. The first service 305₁ may send a command to the IPC Stub 311 associated with the output IPC mechanism to be used. The command provided to the IPC Stub 311 may be setServerAvailable( ) so that the IPC Stub 311 is aware that the first service 305₁ is ready to forward a message.

Referring to FIG. 6A, the first service 305₁ generates a message at step 6.1 to be sent to the second service 305₂. At step 6.2, the first service 305₁ forwards the message to the IPC Stub 311. The first service 305₁ may provide the message to the IPC Stub 311 using commands sendMessage( ) and publishMessage( ).

The sendMessage( ) command may be used to specify a target client to which the message shall be sent. For example, the IPC Listener 312₁ may detect a request message from the second service 305₂. In response, the controller 314₁ may instantiate a handle at the network interface 345₁ dedicated to the second service 305₂. The send Message( ) command may be used to address messages to the specific second service 305₁ associated with the handle.

The publishMessage( ) command may be used if the message is to be sent to all clients in the system. In other words, all client-side services having an input IPC mechanism that is the same as the output IPC mechanism of the IPC Stub 311 are configured to receive the message forwarded by the first service 305₁ using the publish Message( ) command.

The IPC Stub 311 receives the message at step 6.3.

In some embodiments, the IPC Stub 311 is configured to serialize the message using a serialization/deserialization unit 330₁ at step 6.4. The serialization/deserialization unit 330₁ may contain a API information that can be used to serialize the message in accordance with a particular serialization format. In other embodiments, the message is serialized by the first service 305₁. In embodiments where serialization is performed by the first service 305₁, serialization/deserialization API may be provided at the first service 305₁. The format serialization/deserialization used in embodiments of the disclosure is independent of any particular IPC mechanism. In some embodiments, serialization/deserialization is performed using Google Protocol Buffers. As such Google Protocol Buffers API may be provided at the first service 305₁.

In embodiments of the invention, the serialization format is independent of any particular programming language or IPC mechanism so that messages from a variety of services, that may be written using different programming languages, may be serialized. For example, the message may be serialized using Google Protocol Buffers, however, the skilled person will be aware of other suitable serialization formats.

The IPC Stub 311 forwards the serialized message to the first endpoint 340₁ of the channel of the IPC mechanism associated with the IPC Stub 311 at step 6.5.

At step 6.6, the serialized message is then sent from the first endpoint 340₁ of the channel of the IPC mechanism to a second endpoint 340₂ of the channel of the IPC mechanism associated with the second service 305₂.

Referring to FIG. 3B, the client-side system 300₂ includes a second service 305₂ acting as a client. The second service 305₂ includes business logic 306₂ to provide the functionality of the second service 305₂. The client-side system 300₂ includes an IPC Management Module 310₂ and a network interface 345₂. The IPC management module 310₂ is an example of an inter-service communication management module. The IPC Management Module 310₂ includes a controller 314₂. The controller 314₂ is configured to control operations performed by the IPC Management Module 310₂. The IPC Management Module 310₁ and the IPC Management Module 310₂ together form an inter-service communication management system.

The second service 305₂ may include an IPC Management API 320₂. The IPC Management API 320₂ may contain information defining the interactions between the first service 305₂ and the IPC management module 310₂. The IPC Management API 320₂ is independent of the IPC mechanism to be used when receiving a message from the server-side system 300₁.

The second service 305₂ has a configuration file 316₂ associated therewith. The configuration file 316₂ may be stored locally with respect to the second service 305₂ or may be stored remotely. The configuration file 316₂ contains information specifying one or more input IPC mechanisms. Additionally, the configuration file 316₂ may contain information specifying one or more output IPC mechanisms. As such, the second service 305₂ may be configured to act as a both a server and as a client since the second service 305₂ can receive messages sent via an input IPC mechanism and output messages to be sent via an output IPC mechanism.

Referring to FIG. 5, the second service 305₂ is configured to obtain information identifying an input IPC mechanism from the configuration file $316_2$ associated with the second service $305_2$, at step 5.1. At step 5.2, the second service $305_2$ requests that an IPC Proxy 313 be instantiated at the IPC Management Module $310_2$. At step 5.3, the IPC Proxy 313 is instantiated at the IPC Management Module $310_2$ by the controller $314_2$ of the IPC Management Module $310_2$. An IPC Listener $312_2$ may also be instantiated. The IPC Listener $312_2$ and an IPC Proxy 313 are each associated with the input IPC mechanism specified by the configuration file $316_2$ of the second service $305_2$.

The IPC Listener $312_2$ may be configured to monitor the connection status of the first service $305_1$ and the stub 311 associated therewith. The IPC Listener $312_2$ may be configured to inform the second service $305_2$ that the first service $305_1$ and/or the stub 311 has connected using a command onConnect( ) or disconnected using a command onDisconnect( ). The IPC Listener $312_2$ may also be configured to inform the second service $305_2$ and/or the IPC proxy 313 that a message has been forwarded from the first service $305_1$ using a command on Message( ).

The IPC Proxy 313 is configured to act as the interface between the second service $305_2$ and the IPC Channel Endpoint $340_2$.

The controller $314_2$ is configured to obtain IPC API information from an IPC API Library 360 associated with the IPC mechanism of the IPC Proxy 313 at step 5.4. The controller $314_2$ requests instantiation of the IPC Channel Endpoint $340_2$ at step 5.5. The IPC Channel Endpoint $340_2$ is instantiated at step 5.6. The IPC Channel Endpoint $340_2$ may be created specifying one or more of the parameters: protocol type, IP address, and port number.

The client-side system $300_2$ allows messages to be received via an IPC Channel of an IPC mechanism and forwarded to the second service $305_2$. Referring to FIG. 6B, a serialized message is received at the IPC Channel Endpoint $340_2$ at step 6.7. The serialized message may then be forwarded to the IPC Proxy 313 of the IPC Management Module $310_2$ associated with the second service $305_2$ at step 6.8.

The serialized message is received at the IPC Proxy 313 at step 6.9.

In some embodiments at step 6.10, the IPC Proxy 313 may then deserialize the message using a serialization/deserialization unit $330_2$ of the IPC Binding Module $310_2$. The message is then forwarded to the second service $305_2$ at step 6.11. The IPC Listener $312_2$ may alert the second service $305_2$ that a message has been received from the stub 311 using a command on Message( ). The message may be forwarded to the second service $305_2$ by either the IPC Proxy 313 or the IPC Listener $312_2$. At step 6.12, the message is received at the second service $305_2$. While in some embodiments the message is deserialized at the IPC Management Module $310_2$, in other embodiments the message is deserialized at the second service $305_2$.

In this example, the first service $305_1$ sends one or more messages to the second service $305_2$ so that the first service $305_1$ may be thought of as a server and the second service $305_2$ may be thought of as a client. However, the first service $305_1$ may also act as a client in communication with a third service (not shown). As such, the first service $305_1$ may instantiate an IPC Proxy (not shown) at the IPC Management Module $310_1$ associated with an input IPC mechanism specified by the configuration file of the first service $305_1$. This allows the first service $305_1$ to receive messages via an input IPC mechanism. An IPC Channel Endpoint (not shown) associated with the IPC mechanism of the instantiated IPC Proxy may be instantiated by the controller $314_1$.

Furthermore, the second service $305_2$ may also act as a server with respect to a fourth service (not shown). As such, the second service $305_2$ may instantiate an IPC Stub at the IPC Management Module $310_2$. This arrangement provides the IPC Management Module $310_2$ with the functionality to send messages via an output IPC mechanism from the second service $305_2$ to the fourth service. An IPC Channel Endpoint (not shown) associated with the IPC mechanism of the instantiated IPC Stub may be instantiated by the controller $314_2$.

It should also be appreciated that multiple instances of the IPC Stub, IPC Listener, IPC Proxy and IPC Channel Endpoints may be instantiated at the IPC Management Module $310_1$ of the server-side system $300_1$ and at the IPC Management Module $310_2$ of the client-side system $300_2$. Having multiple instances allows multiple output IPC mechanisms and multiple input IPC mechanisms to be supported by the server-side system $300_1$ and the client-side system $300_2$ respectively. This provision is advantageous since it allows services to send and receive messages via different IPC mechanisms simultaneously.

Figure 7:
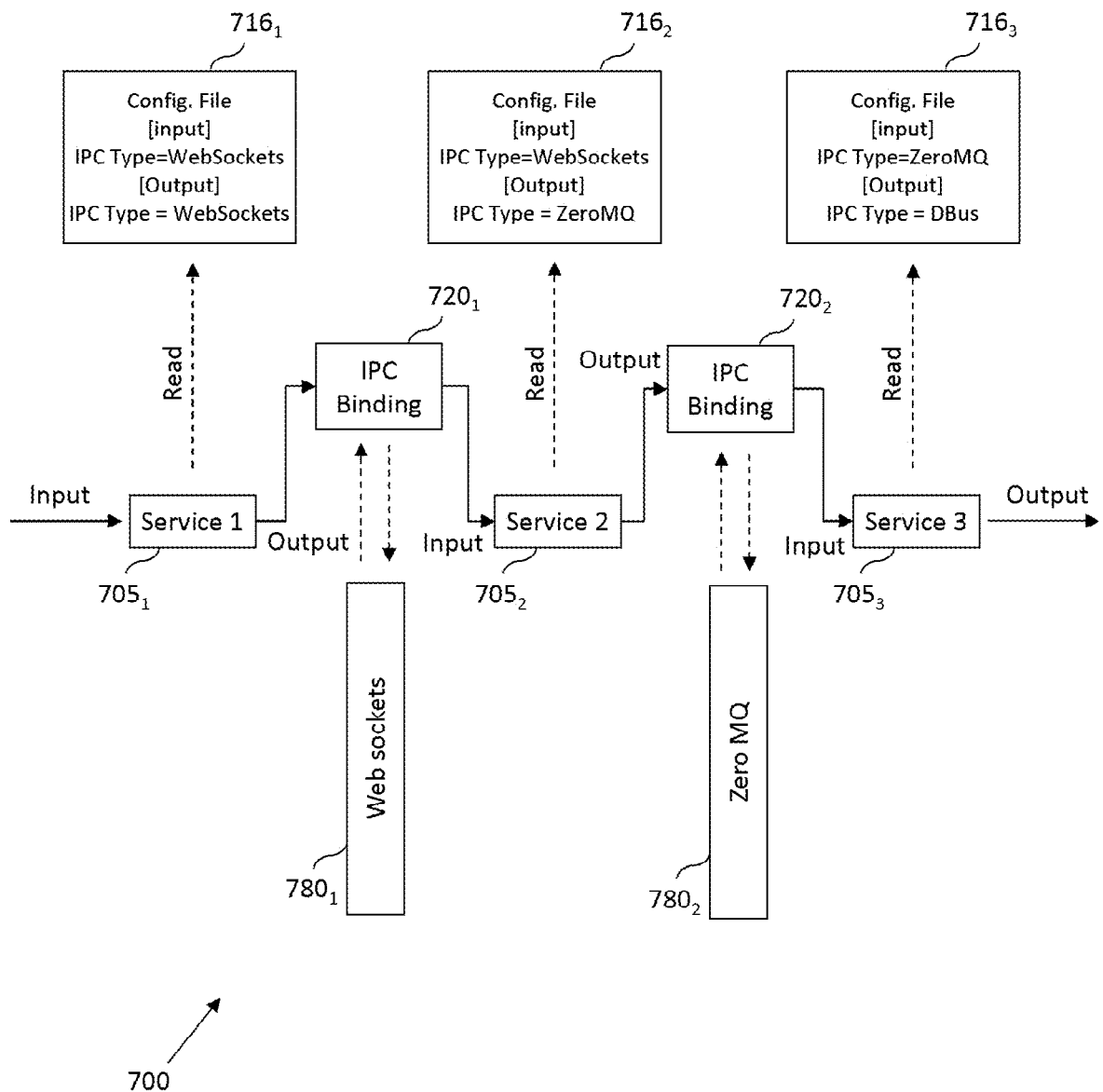
FIG. 7 is a schematic block diagram illustrating a system in a pipeline configuration in accordance with embodiments of the present disclosure.

FIG. 7 illustrates a system 700 in accordance with an embodiment of the present disclosure whereby a first service $705_1$, a second service $705_2$ and a third service $705_3$ are arranged in a pipeline configuration. Such a pipeline configuration may be useful where data is shared between multiple services in accordance with the business logic of the respective services.

The system 700 may be an on-board entertainment system of a vehicle configured to recognize hand gestures to control settings thereof, for example volume settings or to confirm or cancel instructions. The system may be operable to recognize a clockwise rotational movement of a hand to indicate a volume-up command, an anti-clockwise hand movement to indicate a volume-down command, a thumbs-up gesture to indicate confirmation of a command and/or a thumbs-down gesture to indicate cancellation of a command.

In this example, the first service $705_1$ may be a Camera-Service operable to capture images, the second service $705_2$ BodyKeyPointsService may be operable to scan the captured images obtained by the first service $705_1$ to recognize that a gesture has been made. The third service $705_3$ may be a GestureService operable to analyze the meaning of the gesture. As such, information is pipelined from the first service $705_1$ to the third service $705_3$.

The first service $705_1$ is configured to send messages to the second service $705_2$. The messages sent by the first service $705_1$ may include image data obtained by the camera. In this portion of the pipeline, the first service $705_1$ acts as a server and the second service $705_2$ acts as a client. The second service $705_2$ is further configured to send messages to the third service $705_3$. The messages sent by the second service $705_2$ may include an indication that a hand gesture has been detected. As such, in this portion of the pipeline where the exchange of messages is between the second service $705_2$ and the third service $705_3$, the second service $705_2$ acts as the server and the third service $705_3$ acts as the client.

In various embodiments, the first service $705_1$ may be further configured to act as a client by receiving messages from a service (not shown) acting as a server. Likewise, the third service $705_3$ may be further configured to act as a server by sending messages to a service (not shown) acting as a client.

Each service 705 has an associated configuration file 716. Each configuration file specifies an input IPC mechanism (also termed herein as an IPC type) and an output IPC mechanism (also termed herein as an IPC type) for the service 705 with which it is associated. In the example shown in FIG. 7, the IPC mechanism is specified with the field IPCType.

For example, the configuration file 716₁ for the first service specifies an input IPC mechanism "IPCType=WebSockets" and an output IPC mechanism "IPCType=WebSockets". Therefore, the first service 705₁ is configured to receive messages via WebSockets and is configured to output messages via WebSockets. The configuration file 716₂ for the second service 705₂ specifies an input IPC mechanism "IPCType=WebSockets" and an output IPC mechanism "IPCType=ZeroMQ". Therefore, the second service 705₂ is configured to receive messages via WebSockets and is configured to output messages via ZeroMQ. The configuration file 716₃ for the third service 705₃ specifies an input IPC mechanism "IPCType=ZeroMQ" and an output IPC mechanism "IPCType=DBus". Therefore, the third service 705₃ is configured to receive messages via ZeroMQ and is configured to output messages via DBus. The skilled person will understand that other known IPC mechanisms may also be used. An API library for each of the supported IPC mechanisms may be provided in an IPC Management Layer of the system 700, which is referred to in FIG. 7 as an IPC Binding Layer 720, the terms management layer and binding layer being interchangeable.

A first portion 720₁ of the IPC Binding Layer 720 may perform the operations of the server-side IPC Management Module 310₁ and the client-side IPC Management Module 310₂ described above to transport messages from the first service 705₁ to the second service 705₂. Messages are transported via a first IPC channel 780₁, which in this example is WebSockets.

A second portion 720₂ of the IPC Binding Layer 720 may perform the operations of the server-side IPC Management Module 310₁ and the client-side IPC Management Module 310₂ described above to transport messages from the second service 705₂ to the third service 705₃. Messages are transported via a second IPC channel 780₂, which in this example is ZeroMQ.

The configuration files 716 associated with the respective services 705 may be stored locally in memory associated with the respective services. Alternatively, the configuration files 716 may be stored at a remote location. The configuration files 716 may be edited so that a user can modify the input and/or output IPC mechanisms for any of the services 705.

While the foregoing description describes embodiments in which services interact with each other using an IPC mechanism, alternative embodiments allow services to interact without using an IPC mechanism. In such embodiments, the services interact via a non-IPC mechanism. A non-IPC mechanism may be considered to be a communication mechanism where the server and client share a common process space, i.e. where communication is possible without an IPC, by way of direct function calls. In this case, a unique identifier assigned to a server is used by the client to identify and establish a connection. The configuration file of the server may specify an identifier of that server. The configuration file of a client may also specify the identifier of the server with which the client is to establish a communication pathway. A database is maintained establishing a logical connection between the server and the client that are to establish a mutual communication pathway.

Figure 8:
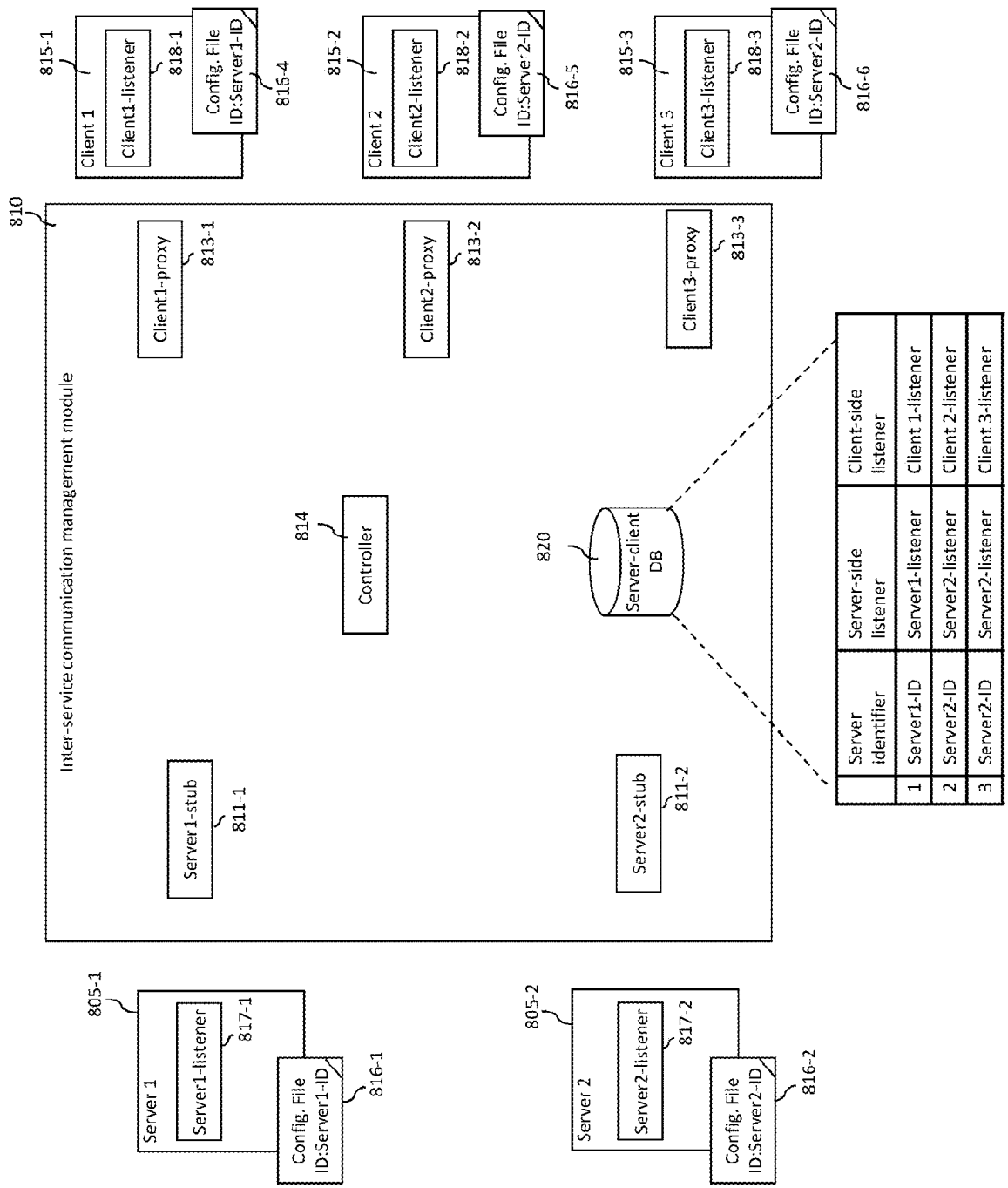
FIG. 8 is a schematic block diagram of an inter-service communication management module, servers and clients in accord a nee with embodiments of the present disclosure.

FIG. 8 is a schematic block diagram illustrating such an embodiment. In this embodiment, server-side services (also referred to as servers) 805 and client-side services (also referred to as clients) 815 are supported by an inter-service communication management module 810 having a controller 814. The inter-service communication management module 810 is an example of an inter-service communication management system.

Each of the server-side services 805 and the client-side services 815 is provided with a configuration file 816. Each configuration file 816 specifies an inter-service communication mechanism for the service associated therewith. The configuration file 816 may be editable so that a user can change the configuration file to update which inter-service communication mechanism is used by a particular service.

In this embodiment, each server-side service 805 shown in FIG. 8 has a configuration file 816 specifying a non-IPC mechanism for performing inter-service communication. The inter-service communication mechanism specified for server 805-1 has an identifier Server1-id which identifies the server 805-1. The inter-service communication mechanism specified for server 805-2 has an identifier Server2-id which identifies the server 805-2.

The controller 814 instantiates a stub 811-1 associated with the server 805-1 at the inter-service communication management module 810. The controller 814 instantiates a stub 811-2 associated with the server 805-2.

Each server 805 may have a server-side listener 817 associated therewith. Each server-side listener 817 is configured to alert the server 805 that a client 815 has requested a service provided by the server 805. For example, the client 815 may send a request message to the server requesting the use of a service provided by the server 805. The server-side listener may alert its associated server 805 using an on Message( ) command.

Each client-side service 815 shown in FIG. 8 has a configuration file 816 specifying a non-IPC mechanism for performing inter-service communication. The inter-service communication mechanism specified for client 815-1 has an identifier Server1-id which identifies the server 805-1. This means that the client 815-1 is to use a service provided by the server-side service 805-1. The inter-service communication mechanism specified for client 815-2 has an identifier Server2-id which identifies the server 805-2. This means that the client 815-2 is to use a service provided by the server-side service 805-2. The inter-service communication mechanism specified for client 815-3 has an identifier Server2-id which identifies the server 805-3. This means that the client 815-3 is to use a service provided by the server-side service 805-2. Each configuration file 816 associated with a client may be updated by a user so that the client may change from using a service provided by a first server to use a service provided by a second server. Furthermore, a user may update the configuration file of a client-side service so that the client-side service specifies one or more IPC mechanisms with which to interact with a server-side service.

Each client 815 may have a client-side listener 818 associated therewith. Each client-side listener 818 is configured to alert its respective client 815 that the server 805 with which the client 815 is to communicate is to provide a message to the client 815. The client-side listener may alert its associated client 815 using an onMessage( ) command.

The controller 814 instantiates a proxy 813-1 associated with the client 815-1 at the inter-service communication management module 810. The controller 814 instantiates a proxy 813-2 associated with the client 815-2. The controller 814 instantiates a proxy 813-3 associated with the client 815-3.

The controller 814 is further configured to maintain a database 820 at the inter-service communication management module 810. The database 820 contains information providing a logical link between a server-side service (or server) 805 and a client-side service (or client) 815 that is to use the service provided by the server 805. Each row of the database provides a logical link between an identifier of the server, a listener associated with that server and a listener associated with a client. The controller 814 may update the database 820 when the stub 811 and proxy 813 are created.

For example, the first row of the database 820 links the identifier server1-id associated with the server 805-1 with the server-side listener 817-1 and the client-side listener 818-1. The second row of the database 820 links the identifier server2-id associated with the server 805-2 with the server-side listener 817-2 and the client-side listener 818-2.

The third row of the database 820 links the identifier server2-id associated with the server 805-2 with the server-side listener 817-2 and the client-side listener 818-3. As such, the database 820 may list a logical connection between one server and multiple clients.

Once the logical connection between the server-side service 805 and the client-side service 815 has been established at the database 820, messages may be exchanged between the server-side service 805 and the client-side service 815. The server 805 may create a message relating to a service to be provided to the client. For example, the server 805-1 may create a message containing content to be provided to the client 815-1. This message is forwarded to the stub 811-1 associated with the server 805-1. Since the stub 811-1 is associated with a non-IPC mechanism, the controller 814 accesses the database 820 to determine a client listener 818-1 logically connected with the service 805-1. The controller 814 alerts the client listener 818-1 to the fact that the stub 811-1 is to forward a message to the proxy 813-1. The message may then be forwarded from the stub 811-1 associated with the server 805-1 to the proxy 813-1 associated with the client 815-1 using one or more direct function calls. The proxy 813-1 may then forward the message to the client 815-1.

In addition to sending messages from the server to the client, for example messages containing content relating to a service provided by the server to the client, the client may also send messages to the server. For example, the client 815-1 may send a request message to the server 805-1 requesting content relating to the service provided by the server 805-1. The client 815-1 may create a request message and forward the request message to the proxy 813-1 associated with the client. The controller 814 searches in the database 820 for a server listener 817-1 having a logical connection with the client listener 818-1. The server listener 817-1 then alerts the stub 811-1 that a request message is to be forwarded from the proxy 813-1 to the stub 811-1. The request message may then be forwarded by the proxy 813-1 to the stub 811-1 via one or more direct function calls. The stub 811-1 may then forward the request message to the server 805-1. The server 805-1 may then respond to the request message by sending a response message to the client. As such, the embodiment provides for two-way communication between the server 805-1 and the client 815-1.

Figure 9:
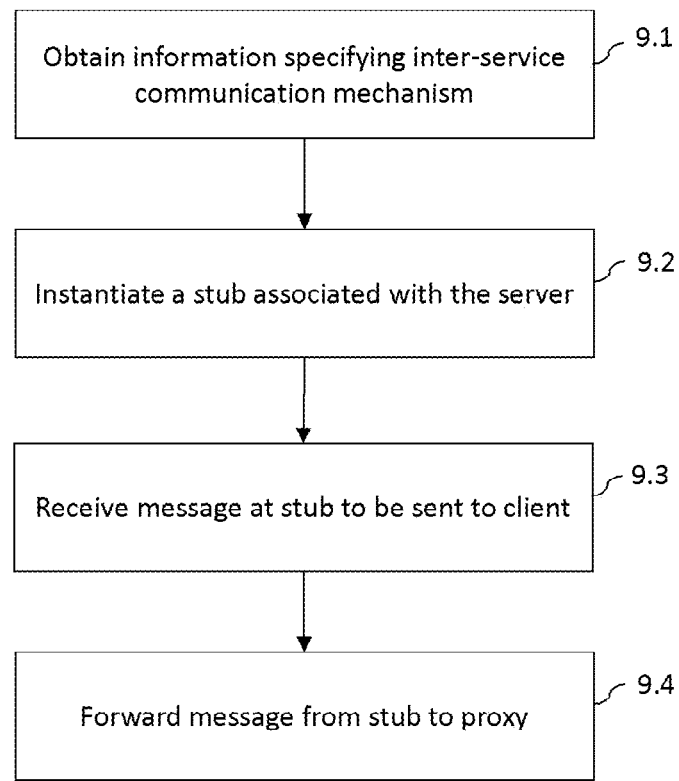
FIG. 9 is a flow chart illustrating server-side operations performed by an inter-service communication management system in accordance with embodiments of the present disclosure.

FIG. 9 is a flow chart illustrating server-side operations performed by an inter-service communication management module or system to manage inter-service communication between a server-side service and a client-side service. Such inter-service communication may be via an IPC mechanism or a non-IPC mechanism. At step 9.1 an inter-service communication management module obtains information specifying an inter-service communication mechanism to be used to send one or more messages from the server-side service to the client-side service. This information is obtained from a configuration file associated with the server-side service. The inter-service communication mechanism may be a particular type of IPC mechanism as explained above with reference to FIGS. 2 to 7. Alternatively, the inter-service communication mechanism may be a non-IPC mechanism as explained above with reference to FIG. 8.

At step 9.2, a stub associated with the inter-service communication mechanism specified by the configuration file is instantiated at the inter-service communication management module. The stub is operable to interact with the server-side service. At step 9.3, a message is received at the stub from the server-side service to be forwarded to a proxy of the client-side service using the inter-service communication mechanism associated with the stub. At step 9.4, the message is forwarded from the stub to the proxy of the client-side service in accordance with the inter-service communication mechanism specified by the configuration file associated with the server-side service.

Figure 10:
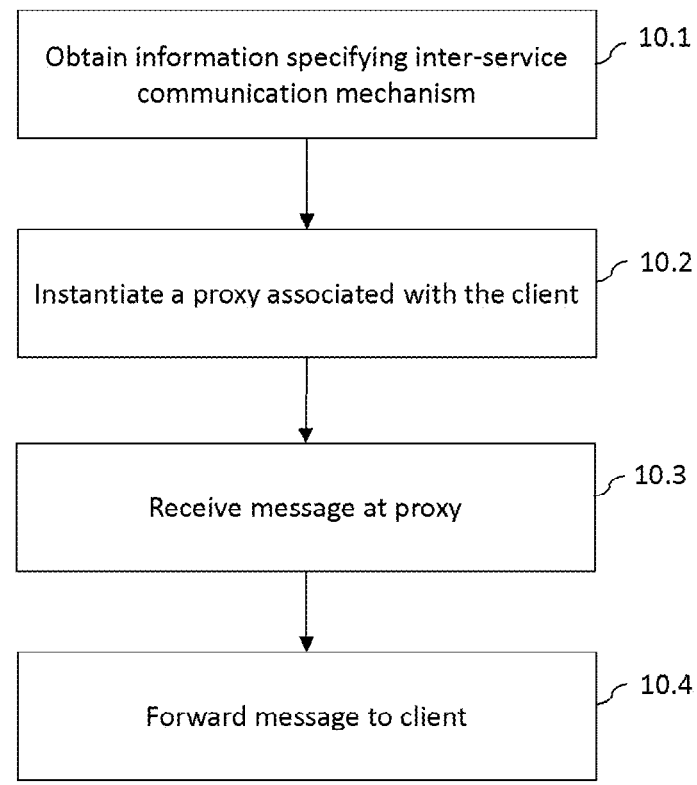
FIG. 10 is a flow chart illustrating client-side operations performed by an inter-service communication management system in accordance with embodiments of the present disclosure.

FIG. 10 is a flow chart illustrating client-side operations performed by an inter-service communication management module or system to manage inter-service communication between a server-side service and a client-side service. Such inter-service communication may be via an IPC mechanism or a non-IPC mechanism. At step 10.1, the inter-service communication management module obtains information specifying an inter-service communication mechanism for receiving one or more messages at the client-side service from the server-side service. This information is obtained from a configuration file associated with the client-side service. At step 10.2, a proxy is instantiated at the inter-service communication management module. The proxy is associated with the inter-service communication mechanism specified by the configuration file of the client-side service. The proxy is operable to interact with the client-side service. At step 10.3, a message is received at the proxy from the server-side service in accordance with the inter-service communication mechanism specified by the configuration file of the client-side service. At step 10.4, the message is forwarded from the proxy to the client-side service.

While the server-side operations performed by the inter-service communication management system have been described with reference to FIG. 9 and the client-side operations of the inter-service communication management system have been described with reference to FIG. 10, it will be appreciated that the operations shown in FIGS. 9 and 10 may be combined into a single method performed by the inter-service communication management system. Such a system may be a distributed system or a system located at a single device.

Figure 11:
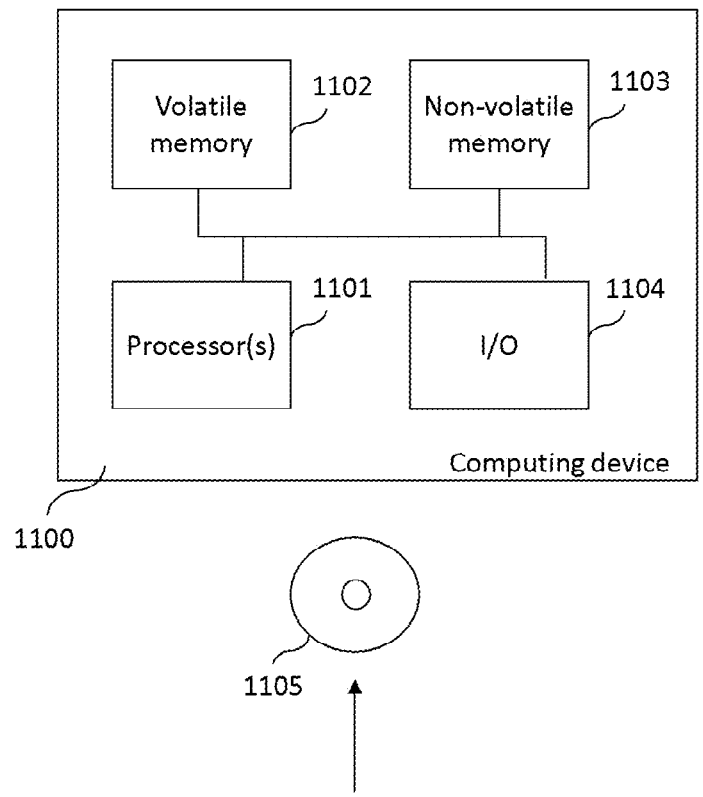
FIG. 11 is a schematic block diagram of a computing device in accordance with embodiments of the present disclosure.

As stated above, the systems described herein may include computing devices distributed across a network. FIG. 11 is a schematic block diagram showing an example computing device 1100. The computing device 1100 includes one or more processors 1101, volatile memory 1102, non-volatile memory 1103 and input/output 1104. The non-volatile memory 1103 may store computer readable instructions to implement aspects of the disclosure described herein. The computer readable instructions may be provided to the non-volatile memory by any appropriate medium such as an optical disk 1105. However, any other suitable medium may be employed.

While specific embodiments have been described herein, it will be apparent to the skilled person that many variations and modifications may be made without departing from the scope of the invention which is defined by the appended claims.

In the foregoing description, example aspects are described with reference to several example embodiments. Accordingly, the specification should be regarded as illustrative, rather than restrictive. Similarly, the figures illustrated in the drawings, which highlight the functionality and advantages of the example embodiments, are presented for example purposes only. The architecture of the example embodiments is sufficiently flexible and configurable, such that it may be utilized in ways other than those shown in the accompanying figures.

Software embodiments of the examples presented herein may be provided as, a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/ storage device may include, by example and without limitation, an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/ archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the example embodiments described herein. Such software may include without limitation device drivers, operating systems, and user applications. Ultimately, such computer-readable media or storage device(s) further include software for performing example aspects of the invention, as described above.

Included in the programming and/or software of the system are software modules for implementing the procedures described herein. In some example embodiments herein, a module includes software, although in other example embodiments herein, a module includes hardware, or a combination of hardware and software.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

Further, the purpose of the Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that any procedures recited in the claims need not be performed in the order presented.

While this specification contains many specific embodiment details, these should not be construed as limitations on the scope of any inventions or of what may be claimed, but rather as descriptions of features specific to particular embodiments described herein. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

Having now described some illustrative embodiments and embodiments, it is apparent that the foregoing is illustrative and not limiting, having been presented by way of example. In particular, although many of the examples presented herein involve specific combinations of apparatus or software elements, those elements may be combined in other ways to accomplish the same objectives. Acts, elements and features discussed only in connection with one embodiment are not intended to be excluded from a similar role in other embodiments or embodiments.

The apparatuses described herein may be embodied in other specific forms without departing from the characteristics thereof. The foregoing embodiments are illustrative rather than limiting of the described systems and methods. Scope of the apparatuses described herein is thus indicated by the appended claims, rather than the foregoing description, and changes that come within the meaning and range of equivalence of the claims are embraced therein.

The disclosure in the description also includes the following examples:

Example 1. A method comprising: obtaining, by an inter-service communication management system and from a configuration file associated with a server-side service, information specifying a first inter-service communication mechanism to be used to send one or more messages from the server-side service to a client-side service; instantiating, at the inter-service communication management system, a stub associated with the first inter-service communication mechanism specified by the configuration file, wherein the stub is operable to interact with the server-side service; receiving, at the stub, a message from the server-side service to be forwarded to a proxy of the client-side service using the first inter-service communication mechanism associated with the stub, wherein the proxy is associated with the first inter-service communication mechanism; and forwarding the message from the stub to the proxy of the client-side service in accordance with the first inter-service communication mechanism specified by the configuration file associated with the server-side service.

Example 2. The method as recited by any of the previous examples, wherein the configuration file specifies an inter-process communication (IPC) mechanism and wherein the stub is associated with the specified IPC mechanism, the method further comprising: obtaining application programming interface, API, information relating to the IPC mechanism associated with the stub; and instantiating a first endpoint of an IPC channel of the IPC mechanism associated with the stub in accordance with the API information of the IPC mechanism associated with the stub.

Example 3. The method as recited by any of the previous examples, wherein the server-side service has a configuration file associated therewith, the configuration file comprising information identifying one or more IPC mechanisms for sending one or more messages from the server-side service to the one or more client-side services.

Example 4 The method as recited by any of the previous examples, wherein the configuration file specifies a non-IPC mechanism, and wherein forwarding the message from the stub to the proxy comprises directly forwarding the message from the stub to the proxy using one or more direct function calls.

Example 5. The method as recited by any of the previous examples, further comprising: further comprising detecting a change to the configuration file of the server-side service updating the inter-service communication mechanism from the first inter-service communication mechanism to a second inter-service communication mechanism and, in response thereto, terminating the stub associated with the first inter-service communication mechanism and instantiating a stub associated with the second inter-service communication mechanism.

Example 6. A method comprising: obtaining, by an inter-service communication management system and from a configuration file associated with a client-side service, information specifying a first inter-service communication mechanism for receiving one or more messages at the client-side service from a server-side service; instantiating, at the inter-service communication management system, a proxy associated with the first inter-service communication mechanism specified by the configuration file, wherein the proxy is operable to interact with the client-side service; receiving, at the proxy, a message from a stub associated with the first inter-service communication mechanism specified by the configuration file; and forwarding the message from the proxy to the client-side service.

Example 7. The method as recited by any of the previous examples, wherein the configuration file specifies an inter-process communication (IPC) mechanism and wherein the proxy is associated with the specified IPC mechanism, the method further comprising: obtaining application programming interface, API, information relating to the IPC mechanism associated with the proxy; and instantiating a second endpoint of an IPC channel of the IPC mechanism associated with the proxy in accordance with the API information of the IPC mechanism associated with the proxy.

Example 8. The method as recited by any of the previous examples, wherein receiving, at the proxy, a message from the server-side service comprises activating, by the inter-service communication management system, the proxy using a listener associated with the client-side service.

Example 9. The method as recited by any of the previous examples, wherein the configuration file specifies a non-IPC mechanism, and wherein receiving the message at the proxy comprises receiving, at the proxy, one or more direct function calls from the stub associated with the server-side service.

Example 10. The method as recited by any of the previous examples, further comprising detecting a change to the configuration file updating the inter-service communication mechanism from the first inter-service communication mechanism to a second inter-service communication mechanism and, in response thereto, terminating a proxy associated with the first inter-service communication mechanism and instantiating a proxy associated with the second inter-service communication mechanism.

Example 11. An inter-service communication management system comprising memory and a controller configured to: obtain, from a configuration file associated with a server-side service, information specifying a first inter-service communication mechanism for sending one or more messages from the server-side service to a client-side service; instantiate, at the inter-service communication management system, a stub associated with the inter-service communication mechanism specified by the configuration file, wherein the stub is operable to interact with the server-side service; obtain, from a configuration file associated with the client-side service, information specifying the first inter-service communication mechanism for receiving one or more messages at the client-side service from the server-side service; instantiate, at the inter-service communication management system, a proxy associated with the first inter-service communication mechanism specified by the configuration file, wherein the proxy is operable to interact with the client-side service; receive, at the stub, a message from the server-side service to be sent to the client-side service using the first inter-service communication mechanism associated with the stub; forward the message from the stub to the proxy in accordance with the first inter-service communication mechanism; receive, at the proxy, the message from the stub in accordance with the first inter-service communication mechanism; and forward the message from the proxy to the client-side service.

Example 12. The inter-service communication management system as recited by any of the previous examples, wherein the first inter-service communication mechanism is an inter-process communication (IPC) mechanism and wherein the stub and the proxy are each associated with the IPC mechanism, wherein the controller is further configured to: obtain application programming interface, API, information relating to the IPC mechanism; instantiate a first endpoint of an IPC channel of the IPC mechanism associated with the stub in accordance with the API information of the IPC mechanism associated with the stub; and instantiate a second endpoint of the IPC channel of the IPC mechanism associated with the proxy in accordance with the API information of the IPC mechanism associated with the proxy.

Example 13. The inter-service communication management system as recited by any of the previous examples, wherein forwarding the forwarding the message from the stub to the proxy comprises: forwarding the message from the stub to the first endpoint of the IPC channel of the IPC mechanism associated with the stub; and sending the message from the first endpoint of the IPC channel associated with the stub to a second endpoint of the IPC channel associated with the proxy.

Example 14. The inter-service communication management system as recited by any of the previous examples, wherein receiving, at the proxy, a message from the server-side service comprises activating, by the inter-service communication management system, the proxy using a listener associated with the client-side service.

Example 15. The inter-service communication management system as recited by any of the previous examples, wherein the first inter-service communication mechanism is a non-IPC mechanism, and wherein forwarding the message from the stub to the proxy comprises directly forwarding the message from the stub to the proxy using one or more direct function calls.

Example 16. The inter-service communication management system as recited by any of the previous examples, wherein the first inter-service communication mechanism is a non-IPC mechanism, and wherein receiving the message from the stub to the proxy comprises receiving, at the proxy, one or more direct function calls from the stub associated with the client-side service.

Example 17. The inter-service communication management system as recited by any of the previous examples, wherein the controller is further configured to: detect a change to the configuration file of the server-side service updating the inter-service communication mechanism of the server-side service from the first inter-service communication mechanism to a second inter-service communication mechanism and, in response thereto, terminate the stub associated with the first inter-service communication mechanism and instantiate a stub associated with the second inter-service communication mechanism.

Example 18. The inter-service communication management system as recited by any of the previous examples, wherein the controller is further configured to: detect a change to the configuration file of the client-side service updating the inter-service communication mechanism of the client-side service from the first inter-service communication mechanism to a second inter-service communication mechanism and, in response thereto, terminate the proxy associated with the first inter-service communication mechanism and instantiate a proxy associated with the second inter-service communication mechanism.

Example 19. The inter-service communication management system as recited by any of the previous examples, wherein the inter-service communication management system is implemented with an on-board entertainment system of a vehicle.

Example 20. The inter-service communication management system as recited by any of the previous examples, wherein the client-side service or the server-side service is at least one of: a camera service operable to capture images; a body key points service operable to scan the captured images obtained by the camera service to recognize that a gesture has been made; or a gesture service operable to analyze a meaning of the gesture.

What is claimed is:

1. A method comprising:
    obtaining, by an inter-service communication management system and from a configuration file associated with a server-side service, information specifying a first inter-service communication mechanism to be used to send one or more messages from the server-side service to a client-side service;
    instantiating, at the inter-service communication management system, a stub associated with the first inter-service communication mechanism specified by the configuration file, wherein the stub is operable to interact with the server-side service;
    receiving, at the stub, a message from the server-side service to be forwarded to a proxy of the client-side service using the first inter-service communication mechanism associated with the stub, wherein the proxy is associated with the first inter-service communication mechanism; and
    forwarding the message from the stub to the proxy of the client-side service in accordance with the first inter-service communication mechanism specified by the configuration file associated with the server-side service.

2. The method of claim 1,
    wherein the configuration file specifies an inter-process communication (IPC) mechanism and
    wherein the stub is associated with the specified IPC mechanism,
    the method further comprising:
        obtaining application programming interface (API) information relating to the IPC mechanism associated with the stub; and
        instantiating a first endpoint of an IPC channel of the IPC mechanism associated with the stub in accordance with the API information of the IPC mechanism associated with the stub.

3. The method of claim 2, wherein forwarding the message from the stub to the proxy comprises:
    forwarding the message from the stub to the first endpoint of the IPC channel of the IPC mechanism associated with the stub; and
    sending the message from the first endpoint of the IPC channel associated with the stub to a second endpoint of the IPC channel associated with the proxy.

4. The method of claim 1,
    wherein the configuration file specifies a non-IPC mechanism, and
    wherein forwarding the message from the stub to the proxy comprises directly forwarding the message from the stub to the proxy using one or more direct function calls.

5. The method of claim 1, further comprising detecting a change to the configuration file of the server-side service updating the inter-service communication mechanism from the first inter-service communication mechanism to a second inter-service communication mechanism and, in response thereto, terminating the stub associated with the first inter-service communication mechanism and instantiating a stub associated with the second inter-service communication mechanism.

6. The method of claim 1, wherein the configuration file is user editable, enabling a user to change which inter-service communication mechanism is used by the server-side service.

7. A method comprising:
   obtaining, by an inter-service communication management system and from a configuration file associated with a client-side service, information specifying a first inter-service communication mechanism for receiving one or more messages at the client-side service from a server-side service;
   instantiating, at the inter-service communication management system, a proxy associated with the first inter-service communication mechanism specified by the configuration file, wherein the proxy is operable to interact with the client-side service;
   receiving, at the proxy, a message from a stub associated with the first inter-service communication mechanism specified by the configuration file; and
   forwarding the message from the proxy to the client-side service.

8. The method of claim 7, wherein the configuration file specifies an inter-process communication (IPC) mechanism and wherein the proxy is associated with the specified IPC mechanism, the method further comprising:
   obtaining application programming interface (API) information relating to the IPC mechanism associated with the proxy; and
   instantiating a second endpoint of an IPC channel of the IPC mechanism associated with the proxy in accordance with the API information of the IPC mechanism associated with the proxy.

9. The method of claim 8, wherein receiving, at the proxy, a message from the server-side service comprises activating, by the inter-service communication management system, the proxy using a listener associated with the client-side service.

10. The method of claim 7, wherein the configuration file specifies a non-IPC mechanism, and wherein receiving the message at the proxy comprises receiving, at the proxy, one or more direct function calls from the stub associated with the server-side service.

11. The method of claim 7, further comprising detecting a change to the configuration file updating the inter-service communication mechanism from the first inter-service communication mechanism to a second inter-service communication mechanism and, in response thereto, terminating a proxy associated with the first inter-service communication mechanism and instantiating a proxy associated with the second inter-service communication mechanism.

12. The method of claim 7, wherein the configuration file is user editable, enabling a user to change which inter-service communication mechanism is used by the client-side service.

13. An inter-service communication management system comprising memory and a controller configured to:
   obtain, from a configuration file associated with a server-side service, information specifying a first inter-service communication mechanism for sending one or more messages from the server-side service to a client-side service;
   instantiate, at the inter-service communication management system, a stub associated with the inter-service communication mechanism specified by the configuration file, wherein the stub is operable to interact with the server-side service;
   obtain, from a configuration file associated with the client-side service, information specifying the first inter-service communication mechanism for receiving one or more messages at the client-side service from the server-side service;
   instantiate, at the inter-service communication management system, a proxy associated with the first inter-service communication mechanism specified by the configuration file, wherein the proxy is operable to interact with the client-side service;
   receive, at the stub, a message from the server-side service to be sent to the client-side service using the first inter-service communication mechanism associated with the stub;
   forward the message from the stub to the proxy in accordance with the first inter-service communication mechanism;
   receive, at the proxy, the message from the stub in accordance with the first inter-service communication mechanism; and
   forward the message from the proxy to the client-side service.

14. The inter-service communication management system of claim 13, wherein the first inter-service communication mechanism is an inter-process communication (IPC) mechanism and wherein the stub and the proxy are each associated with the IPC mechanism, wherein the controller is further configured to:
   obtain application programming interface (API) information relating to the IPC mechanism;
   instantiate a first endpoint of an IPC channel of the IPC mechanism associated with the stub in accordance with the API information of the IPC mechanism associated with the stub; and
   instantiate a second endpoint of the IPC channel of the IPC mechanism associated with the proxy in accordance with the API information of the IPC mechanism associated with the proxy.

15. The inter-service communication management system of claim 14, wherein forwarding the forwarding the message from the stub to the proxy comprises:
   forwarding the message from the stub to the first endpoint of the IPC channel of the IPC mechanism associated with the stub; and
   sending the message from the first endpoint of the IPC channel associated with the stub to a second endpoint of the IPC channel associated with the proxy.

16. The inter-service communication management system of claim 14, wherein receiving, at the proxy, a message from the server-side service comprises activating, by the inter-service communication management system, the proxy using a listener associated with the client-side service.

17. The inter-service communication management system of claim 13,
wherein the first inter-service communication mechanism is a non-IPC mechanism, and
wherein at least one of:
forwarding the message from the stub to the proxy comprises directly forwarding the message from the stub to the proxy using one or more direct function calls, or
receiving the message from the stub to the proxy comprises receiving, at the proxy, one or more direct function calls from the stub associated with the client-side service.

18. The inter-service communication management system of claim 13, wherein the controller is further configured to:
detect a change to the configuration file of the server-side service updating the inter-service communication mechanism of the server-side service from the first inter-service communication mechanism to a second inter-service communication mechanism and, in response thereto, terminate the stub associated with the first inter-service communication mechanism and instantiate a stub associated with the second inter-service communication mechanism.

19. The inter-service communication management system of claim 13, wherein the controller is further configured to:
detect a change to the configuration file of the client-side service updating the inter-service communication mechanism of the client-side service from the first inter-service communication mechanism to a second inter-service communication mechanism and, in response thereto, terminate the proxy associated with the first inter-service communication mechanism and instantiate a proxy associated with the second inter-service communication mechanism.

20. The inter-service communication management system of claim 13, wherein the inter-service communication management system is implemented with an on-board entertainment system of a vehicle.

21. The inter-service communication management system of claim 13, wherein the client-side service or the server-side service is at least one of:
a camera service operable to capture images;
a body key points service operable to scan the captured images obtained by the camera service to recognize that a gesture has been made; or
a gesture service operable to analyze a meaning of the gesture.

22. The inter-service communication management system of claim 13, further comprising at least one of:
wherein the configuration file associated with the server-side service is user editable, enabling a user to change which inter-service communication mechanism is used by the server-side service, or
wherein the configuration file associated with the client-side service is user editable, enabling the user to change which inter-service communication mechanism is used by the client-side service.

* * * * *